(12) United States Patent
Moore et al.

(10) Patent No.: US 10,523,814 B1
(45) Date of Patent: Dec. 31, 2019

(54) ROBOCALL MANAGEMENT SYSTEM

(71) Applicant: Noble Systems Corporation, Atlanta, GA (US)

(72) Inventors: Mark Moore, Dunwoody, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 138 days.

(21) Appl. No.: 15/683,171

(22) Filed: Aug. 22, 2017

Related U.S. Application Data

(60) Provisional application No. 62/377,810, filed on Aug. 22, 2016.

(51) Int. Cl.
*H04M 3/436* (2006.01)
*H04M 3/42* (2006.01)
*H04M 3/493* (2006.01)

(52) U.S. Cl.
CPC ....... *H04M 3/436* (2013.01); *H04M 3/42042* (2013.01); *H04M 3/42059* (2013.01);
(Continued)

(58) Field of Classification Search
CPC ............. H04M 3/436; H04M 3/42059; H04M 3/5175; H04M 1/663; H04M 2201/18; H04M 2201/40; H04M 3/42042; H04M 3/42153; H04M 3/5133; H04M 3/5183; H04M 1/00; H04M 1/6041; H04M 1/665; H04M 1/7253; H04M 1/72533; H04M 1/72572; H04M 2201/39; H04M 2201/41; H04M 2201/60; H04M 2203/2027; H04M 2203/2038; H04M 2203/357; H04M 2203/401; H04M 2203/403; H04M 2203/551; H04M 2203/6027; H04M 2203/655; H04M 2250/60; H04M 3/2218; H04M 3/42068; H04M 3/42102; H04M 3/493; H04M 2203/301; H04M 3/4211; H04M 3/42221; H04M 3/42382; H04M 3/4365; H04M 3/5125; H04M 3/5158; H04M 3/5166; H04M 3/5191;
(Continued)

(56) References Cited

U.S. PATENT DOCUMENTS 9,014,359 B1 * 4/2015 Pfeffer .................. H04M 3/436
  379/211.02
9,071,683 B1 * 6/2015 Somes .............. H04M 3/42059
(Continued)

*Primary Examiner* — Akelaw Teshale

(57) ABSTRACT

A robocall management system (RMS) comprises a service switching point switch, a service control point, and a robocall confirmation system, that all cooperate in processing incoming calls to a subscriber. If the call is not a robocall, the call will be delivered to the subscriber as normal. If the call is, or may be, a robocall, then call will be diverted to the robocall confirmation system, which will determine whether the caller is a live person or a computer playing an announcement. If the caller is a live person, then the call is offered to the subscriber. If the caller is a robocaller, then the robocall announcement is recorded by the robocall confirmation system and made available to the subscriber should they choose to listen to it. Various algorithms may be employed along with external data to ascertain a likelihood of whether the call is a robocall.

20 Claims, 7 Drawing Sheets

(52) U.S. Cl.
CPC .... *H04M 3/493* (2013.01); *H04M 2203/2027* (2013.01); *H04M 2203/301* (2013.01)

(58) Field of Classification Search
CPC ............. H04M 3/5232; H04M 3/5235; H04M 3/53308; H04M 3/53391; H04M 3/543; H04M 7/0033; H04M 7/006; H04M 7/0075
See application file for complete search history.

(56) References Cited

U.S. PATENT DOCUMENTS

| | | | |
|---|---|---|---|
| 2014/0112459 A1* | 4/2014 | Goulet | H04M 3/436 379/88.01 |
| 2014/0119527 A1* | 5/2014 | Cohen | H04M 3/42059 379/207.13 |
| 2014/0192965 A1* | 7/2014 | Almeida | H04M 3/436 379/70 |
| 2015/0046214 A1* | 2/2015 | Jain | G06Q 30/0201 705/7.29 |
| 2015/0195403 A1* | 7/2015 | Goulet | H04M 3/436 379/142.05 |
| 2016/0050316 A1* | 2/2016 | Jain | H04M 3/4365 379/221.14 |
| 2017/0013122 A1* | 1/2017 | Cohen | H04M 3/436 |
| 2017/0048388 A1* | 2/2017 | Sharpe | H04M 3/436 |

* cited by examiner

ROBOCALL MANAGEMENT SYSTEM

CROSS REFERENCE TO RELATED APPLICATION

This application claims priority to U.S. provisional patent application 62/377,810, filed on Aug. 22, 2016, the contents of which is incorporated by reference for all that it teaches.

BACKGROUND

The increase in availability of inexpensive Voice over Internet Protocol ("VoIP") technology and telecommunications services has contributed to the drastic fall in telecommunication costs over the past several decades. It is now feasible from a cost perspective for an enterprise to locate their customer service agents in a call center in a foreign country to handle calls from customers in the United States. Decades ago, the cost of routing a call over a long distance would have made this practice impractical. A downside of this reduction of costs, is that it is now feasible for scammers to originate calls from overseas into the U.S. for various nefarious purposes.

Furthermore, VoIP technology, including a common protocol for controlling calls called Session Initiation Protocol ("SIP"), allows the call originator to indicate the calling party number ("CPN"). The CPN is also sometimes referred to as the automatic number identification ("ANI"), but there are slight distinctions in their function, but both the CPN and the ANI are commonly broadly used for referring to the telephone number of the originating party, and hence it is common for one skilled in the art to use these interchangeably. For purposes herein, the term CPN is used.

A call originator using SIP can indicate any CPN value in the call signaling, including one that is not allocated to that call originator. In other words, the CPN indicated by a party originating a call, when subsequently dialed, will not result in that call being routed back to that party. That practice is sometimes called "spoofing." Thus, after the called party is presented with that CPN and later dials that number, the call would not be routed back to that call originator. It may be routed to someone else, or the number may not be even assigned. There are legitimate applications for spoofing. For example, doctors may employ a third party to originate calls to the doctor's patients for providing appointment reminders, where the third party is authorized to indicate the CPN of the doctor. Thus, patients viewing the CPN know that the call is from their doctor. However scammers take advantage of this capability to originate calls by pretending to be someone else.

For example, one common scam is for the call originator to allege they are from the Internal Revenue Service ("IRS"). They may originate a call in a foreign country using a CPN associated with the IRS. When that call is delivered to the called party, the CPN may be used to query a database for calling name information. Thus, to a user with calling name delivery service, both the telephone number displayed and the calling name displayed indicate the call is from the IRS. The caller then informs the called party of money allegedly owed and demands payment from the unsuspecting individual. There are any number of variations where the scammers impersonate other officials. Typically, payment is in some form of gift cards or other forms that cannot be easily traced.

Many illegal calls are telemarketing calls that may originate in the U.S. in an attempt to sell a service. These telemarketing calls are frequently illegal because they target individuals indiscriminately. They call wireless and wirelines numbers, and typically ignore whether the called number is listed in the national or a state's do-not-call ("DNC") database. Frequently, these illegal telemarketers originate a large number of calls, typically on the order of hundreds of thousands to millions of calls per month. They recognize that in many instances, calls will be ignored or not answered, but the few instances where callers answer and provide monetary payment provide the incentive to continue operation of these scams. These telemarketers may or may not spoof a CPN in conjunction with these scams.

These and other types of calls are sometimes called "robocalls" in a derisive manner. For purposes herein, a "robocall" refers to a call that automatically plays a pre-recorded announcement or other audio recording to the called party upon the called party answering the call. For purposes herein, the caller (a.k.a. calling party) is said to be a "robocaller." The Federal Communications Commission ("FCC") has variously defined a "robocall," including one definitions based on calls dialed by an autodialer, but the scope of an "autodialer" is unclear. The Federal Trade Commission ("FTC") has used a definition of a robocall similar to what is indicated above in that it requires a recorded announcement to be automatically played upon the call being answered.

One obvious result of the definition used herein is that a call cannot be known to automatically play a pre-recorded announcement until the call is actually answered. Thus, a robocall cannot be identified with certainty until it has been answered. Yet, throughout this specification, reference will be made to handling a call on the assumption that it is a robocall. Information about a call may suggest a high likelihood that it is a robocall, and reference to such calls as being a robocall should be interpreted as the call as highly likely being a robocall. In other instances, where there is not a high level of confidence of the call being a robocall, the call may be referred to as potentially being a robocall or that it may be a robocall. The context should clarify as to the relative certainty of whether a call is a robocall or may be a robocall.

Robocalls have long been the number one consumer complaint made to the FTC and FCC, but many robocalls are legal and are desired by consumers. Many informational calls could be classified as a robocall, including emergency notifications, appointment scheduling or reminders, prescription refill reminders, bank fraud alerts, etc. Thus, there are many type of calls that are legal, beneficial, and desirable, which provide pre-recorded announcements to the called party. However, because scammers can easily and cheaply initiate such large numbers of illegal robocalls, this term has become synonymous with only illegal calls and has overshadowed those calls which are legal and/or wanted.

Technology can reduce illegal robocalls, but this is a challenge because it is not readily possible to determine which robocalls are legal, and which are not. Frequently, the determination involves knowing various factors that cannot be readily known from the call itself, including the contents of the announcement played after the call is answered, whether the called party is on a DNC list, whether the called party has an existing relationship with the calling party, etc.

The ability to "spoof" caller ID information (which may include either or both calling party number and calling name) allows an illegal robocaller to indicate caller ID information of a legitimate caller and thus make the robocaller appear to be legitimate. Spoofing caller ID information, such as the CPN, is not illegal unless misleading or inaccurate caller ID information is conveyed with the intent to defraud, cause harm, or wrongly obtain anything of value. If no harm is intended or caused, then spoofing is frequently legal. Further, if the scammer is using a telephone number that is accurate, i.e., a number that is assigned to them, then they are not spoofing.

Some simplistic robocall mitigation approaches attempt to block a call based on the CPN. Robocall blocking schemes which attempt to block all calls based on a certain caller ID may inadvertently block legitimate calls, or allow illegal robocallers to circumvent such schemes by spoofing a legitimate caller ID value. Many of the approaches technological solutions proposed for managing robocalls are insufficient in that they attempt to use a single decision making approach to address the problem. Some may rely on a "whitelist" of approved CPN values, while others may rely on a "blacklist" of disapproved numbers. Other approaches rely on detecting the absence of a human being as the caller when the called party answers the call. However, this would screen out all robocalls, including wanted, legal calls.

The nature of the problem is that any one mechanism is likely to be deficient in managing the problem and does not address how to manage various levels of control that need to be offered to the various parties having legitimate interests. Further, many of these solutions do not provide adequate control mechanisms to called parties, carriers, and originators of legitimate robocalls. Therefore, mechanisms are needed to more accurately determine and manage how robocalls are treated with respect to blocking or otherwise identifying which calls are likely to be illegal calls. It is with this and other concerns that the disclosed concepts and technologies are presented.

SUMMARY

In general, embodiments of the present invention provide computer-program products, methods, systems, apparatus, and computing entities for a robocall management system ("RMS"). The RMS may be implemented by a voice carrier to ascertain which calls are illegal or unlikely unwanted by a called party, and may route the call to a device that further determines whether the call is a robocall and how to handle the call. This is accomplished by using a service switching point switch ("SSP switch"), a service control point ("SCP") and a robocall confirmation system ("RCS") operating in a cooperative manner to define how to process calls that are known or suspected to be robocalls.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

GLOSSARY

Figure 1:
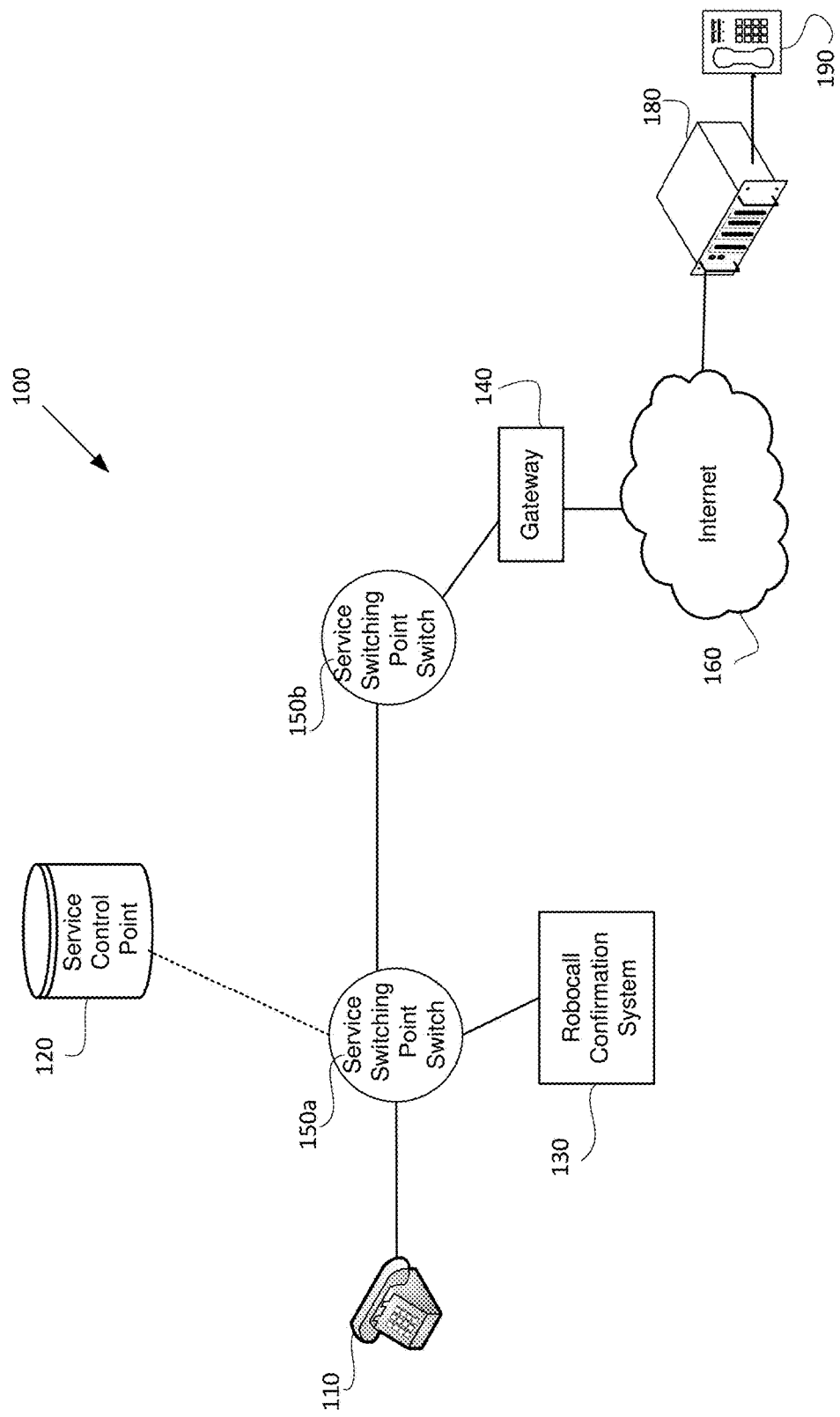
FIG. 1 illustrates one embodiment of an architecture for a robocall management system deployed by a service provider.

The following terms are given the following meanings.

Service Switching Point ("SSP") Switch—a voice switch deployed by a voice service provider, which may be wireline or wireless, serving the called party, which is configurable to launch a query to an external service control point component and receive a response from the service control point component directing the SSP Switch how to process a call to the called party.

Service Control Point ("SCP")—a computer processing system configured to receive a query from a SSP switch requesting instructions about how to process a call received at the SSP for a called party and provide a response to the SSP switch directing it as to how the call should be processed.

Robocall Confirmation System ("RCS")—a voice termination device configured to receive and answer a call, receive audio on the call, and process the audio of the call based on whether it is known to be a robocall or to determine whether it is a robocall. In one embodiment, the RCS can provide a prompt to the caller and determine whether the audio is responsive to the prompt suggesting that the caller is a live person or whether the audio is nonresponsive to the prompt suggesting the caller is not a live person.

Robocall—a call that automatically plays a pre-recorded announcement or other audio recording to the called party upon the called party answering the call.

Caller/Calling Party—the entity originating a call. In the case of a robocall, the caller is a computer based dialing system automatically playing a recording and is not considered to be a live person. In the case of non-robocalls, the caller may be a live person.

DETAILED DESCRIPTION

Many illegal robocallers send a large number of VoIP calls where a pre-recorded announcement is initially played upon answer, and in some cases, based on the called party's response, the call may be transferred to an agent. Most illegal robocallers do not have an agent automatically connected to the call after the call has been answered, since doing so would require more agents. (Indeed, the definition of a robocall is that an automated system plays an announcement initially upon answer.) In many cases, the called party disconnects or expresses no interest after being informed of the purpose of the call, and if an agent were automatically connected on each call, then this would often waste the agent's time. Unlike computers that can play announcements 24 hours a day, agents typically are paid, and work a shift. Thus, when robocalls are answered and play their recording, it is only if the called party interacts and expresses interest that agents are then connected to the call. Providing agents on every call, when many calls are unanswered or the called parties hang up immediately, would cost too much money and limit the number of calls scammers originate. Hence, this solution is based on detecting or determining a high likelihood that a call will play an announcement to the called party, i.e., that the call is likely a robocall.

Overall Architecture Framework

The robocall management system ("RMS") is a system designed to be deployed by a voice service provider (a.k.a. "carrier" herein) to provide a robocall management service on behalf of its customers. It is presumed that the service will be provided to customers who opt-in (e.g., subscribe to the service) and such a telephone customer is referred to herein as a "subscriber." Thus, the subscriber may also be referred to as the "called party" in the appropriate context. Should the service be provided by the subscriber's carrier on a mandatory basis, or without a fee, that does not negate the application of the concepts disclosed herein.

An exemplary framework is shown in FIG. 1, and this is based in part on a traditional telephony network, as opposed to a SIP, VoIP, or IP-based wireless network architecture, but this can apply to a network entirely based on SIP, VoIP, IP, wireless, or other technologies and combinations. Further, the nomenclature used corresponds to that associated with the Advanced Intelligent Network ("AIN") which those skilled in the art of telephony will be familiar with, but those skilled in the art will recognize that the concepts correlate to other network architectures that have similar constructs and different names. For example, other names for these elements are known to those skilled in the art in other contexts, including other names for products or capabilities of a particular carrier, vendor, or application. For example, wireless network providers have a system of network control called "CAMEL" (Customized Applications for Mobile networks Enhanced Logic"). Other switch and telecommunication vendors publish application programming interfaces for allowing an external device controlling how calls are processed. Other vendors manufacture interactive voice response units which can accept and process a call in a certain manner, which could be adapted for some of the components disclosed. Thus, the illustration using a conventional telephone network, and an AIN context, should not be construed to limit the embodiments. Further information about the AIN network architecture are readily available.

The architecture 100 shown in FIG. 1 is simplified, in order to highlight certain aspects. As a way to introduce some of the elements, consider how a call from a call originator could progress to a called party absent processing by a RMS service. The call could originate from a telephone 190 connected to a PBX or other voice switching device 180. This could be based on IP technology. The calling party could be an agent in a call center or could be consumer or business connected to a cable system. The call is delivered to the Internet 160 where is it routed to a gateway 140. The gateway functions to convert IP based calls to conventional telephony based calls. Thus, the call proceeds to a telephone switch 150b, which could be based on various technologies. That switch 150b determines the call should be routed to another switch 150a, which then rings the telephone 110 of the called party when the call is offered.

At a high level, the last telephone switch 150a could be viewed as part of the serving carrier or service provider of the called party. The originating service provider could be viewed as the operator of the PBX 180 depending on how that term "originating" is defined. In other embodiments, the intermediate switch 150b could be part of the serving carrier's network, or it could be a transient or intermediate carrier relative to the serving carrier.

The called party is illustrated by a telephone 110, which in this embodiment represents a landline telephone. It could be based on various technologies, including VoIP. The called party is presumed to be a subscriber to the RMS service, and hence is also referred to as the "subscriber." The telephone 110 may have a caller ID display, capable of showing the calling telephone number ("CPN") and/or calling name. It is not necessary that it have this capability, though.

The telephone 110 is connected via a local loop or some other technology to the service carrier's telephone switch 150a. In this case, the telephone switch is configured with certain AIN capabilities, and hence is hereafter referred to as a Service Switching Point ("SSP") switch 150a. A SSP switch can be configured with "triggers" which are points during the call processing that allows the SSP switch to interrupt call processing and query an external entity, such as a service control point ("SCP") 120. Although the SCP is shown as a database icon in FIG. 1, it is in fact a computer specially configured for processing algorithms for determining how the SSP switch should handle the call. This algorithm may access large amounts of data in a database, and after processing the data with respect to present call, the SCP returns a result to the SSP switch. For example, a trigger can be provisioned on the SSP switch for the subscriber by associating the trigger with the telephone number of the subscriber. At a high level, whenever an incoming call to the SSP switch is received for that telephone number, the SSP switch will interrupt its normal processing and initiate a query to the SCP. (In some cases, the SSP may not send a query based on the originator of the call, as will be seen.) The query will indicate the calling party number ("CPN") and the called party number, so the SCP knows the context of what call is involved. The SCP may use the calling party number to access an integrated (or external) database. That information may be used by the algorithm in the SCP to determine how to respond to the query. The SCP may instruct the SSP switch to end the call, so that it is blocked from being offered to the subscriber. The SCP may alternatively instruct the SSP switch to allow the call to be offered, or divert it to another destination.

The RMS is associated with the called party's serving carrier, and typically involves the SSP switch 150a, the SCP 120, and another device called the robocall confirmation system ("RCS") 130 operating in a coordinated manner. It is possible that ownership or control of one or more component may be outsourced by the service carrier. In one embodiment, the RCS is capable of receiving an incoming call, answering the call, and potentially storing or analyzing the recorded announcement that the call originator plays. The solid lines between the various components shown in FIG. 1 reflect that a voice channel may be present to convey audio, whereas the dotted line between the SSP switch 150a and the SCP 120 reflects that signaling messages, as opposed to voice traffic, is being conveyed. There may also be signaling between the RCS and SCP (but not shown in FIG. 1). Typically, there are also signaling messages conveyed in conjunction with the voice traffic as well, but these are not shown as separate lines in FIG. 1.

At this point, a core aspect of the RMS system operation can be explained. For every incoming call (or for most incoming calls) to the subscriber at a called number at the SSP switch 150a, the SSP 150a sends a query to the SCP asking it for instructions on how to handle that particular call. The SCP may allow the call to be offered as normal to the called party, or divert the call by routing it to the RCS 130. The SCP has an algorithm for processing the calling party number ("CgPN") to determine whether the call is likely a robocall, legal or otherwise. As will be seen, the algorithm may take into account a variety of input sources to determine the most appropriate action to take for that particular call. If the call is not a robocall, then the SCP will instruct the SSP switch 150a to offer the call as normal to the called party. If the call is a robocall, the SCP may in certain instances allow the call to proceed as normal to the called party (such as when it is known the call is a legal and wanted robocall), but more likely will divert the call to the RCS 130. There, the RCS 130 may take different actions. The goal is to define the processing algorithm in the SCP to properly manage the call according to the various different situations that may occur, and in accordance with the subscriber's particular preferences. This capability is not present in the prior art, which attempts to force a single solution on single type of call processing context.

Although not shown, the subscriber may have a network-based voice mail service, which involves a voice mail system (VMS) where unanswered calls may be forwarded to for processing. The VMS is used to store messages left by a caller, and this functionality may be incorporated into the RCS. Thus, in various embodiments, a VMS systems may co-exist in the service carrier's network with an RCS, the VMS may be augmented to include the RCS functionality, or the RCS may also perform VMS functions. As will become evident, a robocall may be diverted to the RCS, which answers the robocall and may store the announcement that is played. Further, the RCS may inform the subscriber of the presence of such messages and allow the subscriber to review and delete such messages. Thus, there is some similarity in the functions performed by the RCS and VMS which may make their integration attractive. However, the RCS is not a VMS system, and they are not interchangeable.

A fundamental challenge in processing a call is to determine what type of call it is. If the call is not a robocall, that is, the calling party is a live person, then the called party (subscriber) is presumed to want to receive the call and the call should be offered to the subscriber as normal. There is the potential that important information is to be conveyed to the called party. Thus, even though the call is offered to the subscriber, there is associated RMS processing of the call. On the other hand, if the call is a robocall, then the called party may, or may not, want to receive the call. For example, the robocall may be known to be an illegal robocall from a scammer engaged in fraudulent activities. On the other hand, the robocall may be legal and convey important information to the called party. Even if the called party does not want to receive the call, they may want to know of the call and what the prerecorded message was.

This is complicated because the called party may definitely want to hear the recorded announcement or may not, which may depend on the entity originating the call. Further, if the called party does not want to hear the announcement, the called party may want to access that information at a later time, just in case that information was important. It would appear that these options are contradictory in their operation. However, as will be seen, the system is able to provide the proper handling of a call in most of the cases, and if an undesired call handling operation was provided, the information in the recorded announcement can be frequently be reviewed. Thus, there is no loss of information provided from the pre-recorded announcement.

To illustrate why a called party may want different treatment in different situations, consider that the called party may have booked an airline flight and the airline is calling to provide an update via a pre-recorded announcement, which is in fact, a robocall. The called party, if informed about this, would likely want to receive the call, or at least be informed of it to review the information later. On the other hand, the called party may not want to receive a call offering a discounted cruises or vacations, which is frequently an illegal and fraudulent robocall. In this particular case, if the called party has placed their number on the DNC list, and has no prior relationship with the call originator, then that robocall would be an illegal robocall (even if not fraudulent). On the other hand, if the called party did have a relationship with the call originator, the call would not be illegal, and perhaps the called party does want to receive the call, or at least be aware of it.

The algorithm in the SCP for determining how to best handle a particular call cannot be 100% correct at all times. Mechanisms are provided allowing the called party to provide adjustments as to how calls would be handled. With this understanding, one possible baseline definition for how calls are to be treated is:

1) Legitimate, conventional, non-robocalls (i.e., from a live person) should be offered to the called party as normal.
2) Legal robocalls should be offered to the called party as normal or their recordings are to be recorded for future review.
3) Illegal robocalls should be diverted from the called party, where the announcements may or may not be recorded for subsequent review.

As will be seen, this is only one default treatment. It is possible that all robocalls, legal and illegal are diverted so that they messages are recorded. Or, it is possible that legal robocalls are diverted and their recordings are stored, for future review by the called party and where the recordings of known illegal calls are not stored for future review. As will be seen, a number of options can be configured as to how calls are to be processed.

Figure 2:
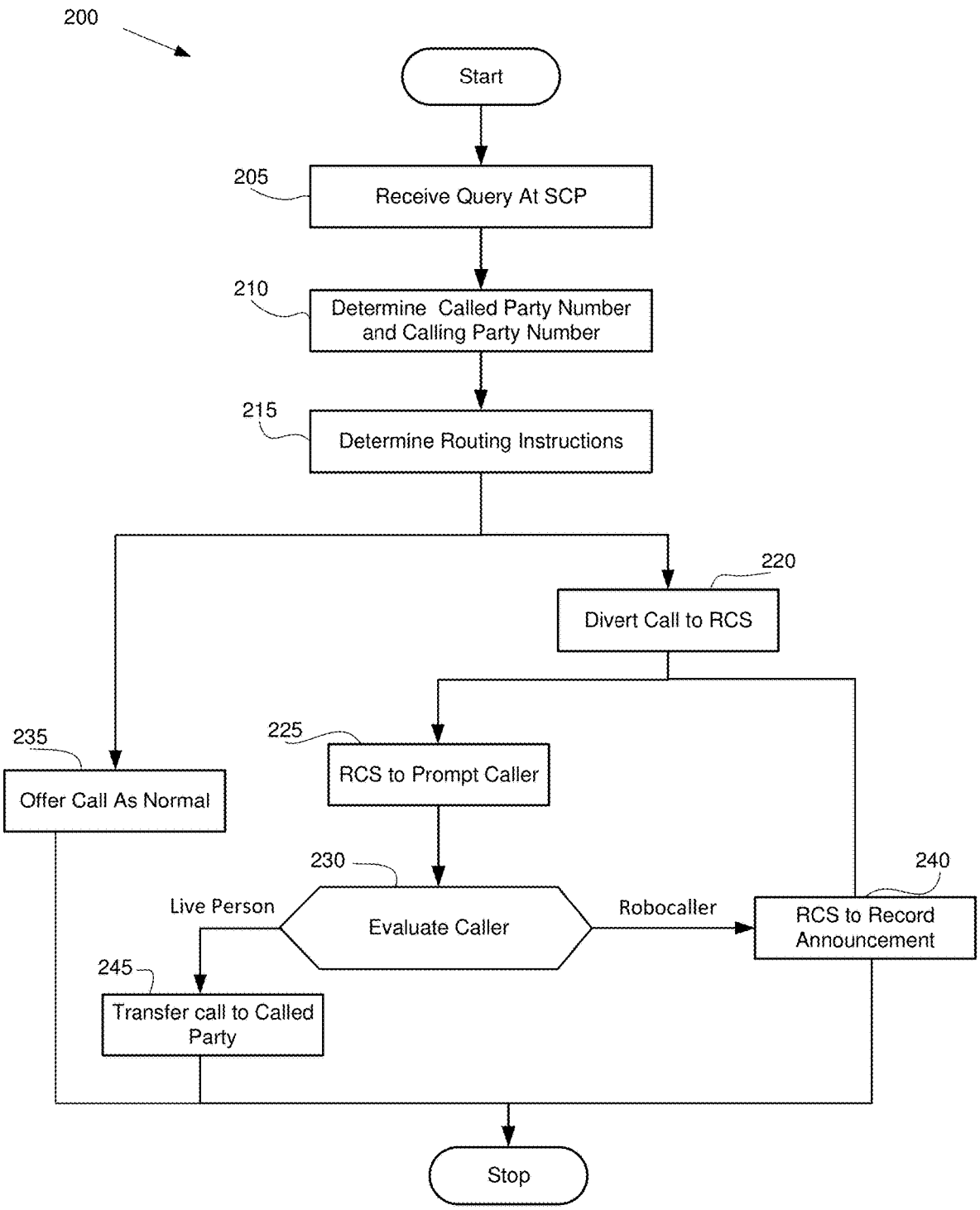
FIG. 2 illustrates one process flow for handling a potential robocall in a robocall management system.

A flow describing the how the SCP and the RCS work together to process a particular incoming call to the called party is shown in FIG. 2. The process 200 begins with step 205 with the query from the SSP switch being received at the SCP for an incoming call to the called party. The query includes various information, including the called party number, the calling party's number, and may include other information, and an indication of the nature of the query (e.g., "provide instructions"). The determination of the calling party number and the called party number by the SCP occurs in step 210. Next, based on the information, the routing instructions are determined in the SCP. As will be seen, the SCP may access or utilize external information to determine whether the call is: likely not a robocall, is a robocall, or may be a robocall.

Once the determination is made by the SCP, the one of two possibilities will occur. In one case, the SCP informs the SSP switch to offer the call as normal 235. This option is used if the call is determined to likely not be a robocall, i.e., that a live person is calling. This option may also be used if the call is a robocall, but has been authorized for delivery (i.e., whitelisted). The delay in processing the query (i.e., the amount of time between the call is received by the SSP and the query response informs the SSP switch to continue offering the call) is minimal. The other option is to divert the call to the RCS in step 220. This may be done if the SCP determines the call is definitely a robocall or because the call may possibly be a robocall. If the confidence level suggests the call is a robocall and it is not whitelisted, then it is diverted to the RCS so that the announcement may be recorded and/or analyzed. If the confidence level suggests the call may be a robocall, then the RCS may provide additional certainty as to whether it is a robocall.

The SSP switch may be instructed by the SCP response to route the call to the RCS. The SCP may indicate one of several numbers of the RCS the call should be directed to, where each number is associated with different processing of the call. As will be seen, the RCS could answer the call and record the announcement, answer the call and prompt the caller, or perform some other action. The number to which the call is directed to could have the corresponding form of processing associated with it. The RCS will receive and answer the call. The RCS will know of the expected processing that should occur. This can be indicated by the SCP signaling the information to the RCS or by merely directing the call to one of two specific numbers, where each number is associated with the particular call processing actions.

In the first case, the RCS may determine whether the call is a robocall or not. This is accomplished by answering the call and interacting with the caller by offering a prompt in step 225. If the caller interacts as a live person would in operation 230, then a determination may be made that the caller is a live person. If so, then the call is transferred to the called party in operation 245.

If the determination at step 230 is that the caller is a robocaller (i.e., a computer playing an announcement), then the process proceeds to step 240 where the RCS may record the announcement provided. The announcement may be subsequently retrieved and played by the called party. In other embodiments, the RCS may analyze the recording or otherwise discard the recording (i.e., not record it).

Basic Processing Tools/Concepts

First, some of the basic constructs for how calls be handled are discussed. Not all mechanisms are used in a given call flow, but a basic understanding of the concepts below are useful in explaining the more sophisticated controls and how they can be combined to handle a variety of call types.

Whitelists

A whitelist is a list of telephone numbers maintained in the SCP, which indicates the call is approved and may be offered to the called party. Thus, when the SSP switch queries the SCP, the CPN will be examined to determine if the CPN is on the whitelist. If so, then the SCP responds to the query by instructing the SSP switch to offer the call to the called party.

Figure 3:
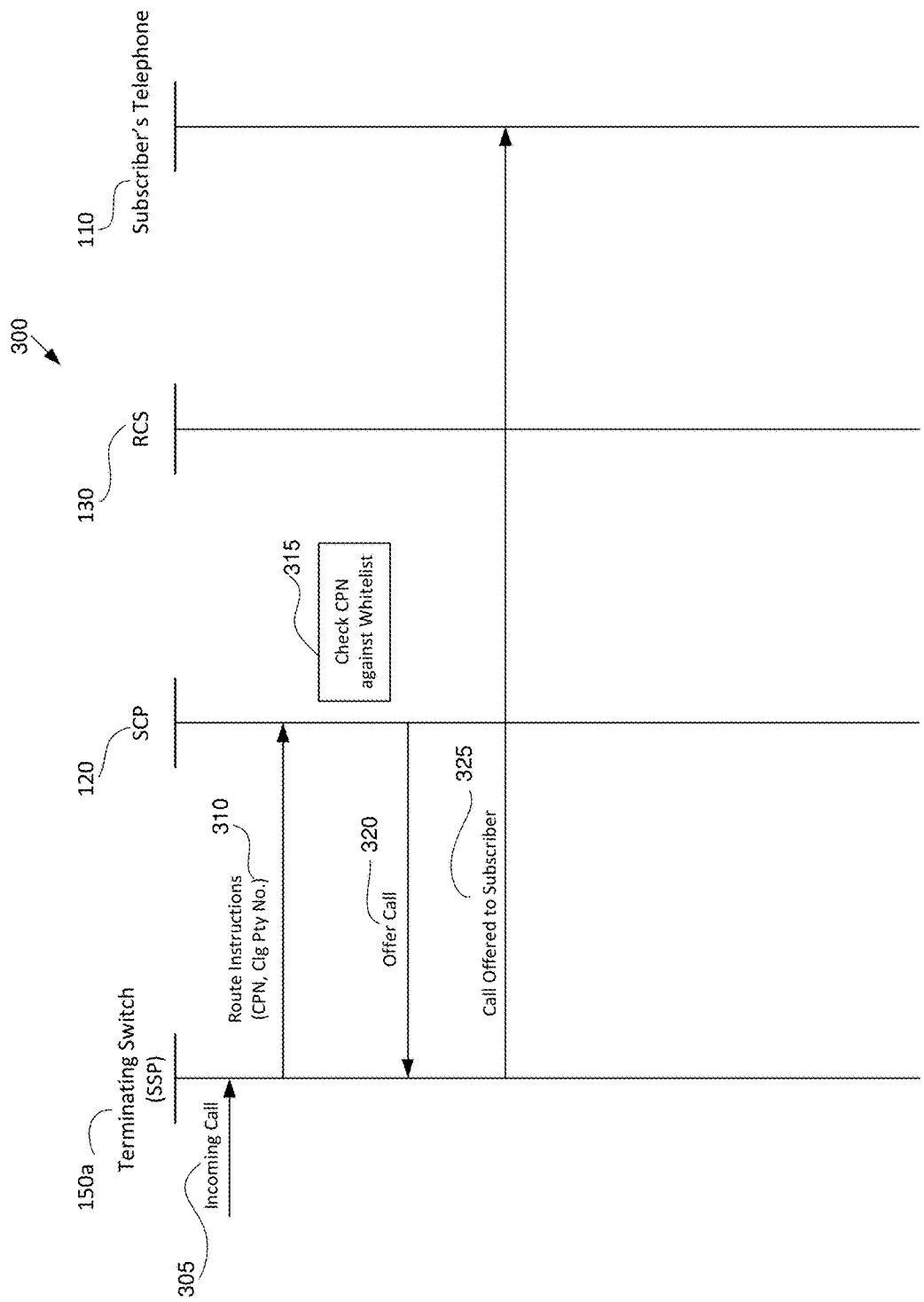
FIG. 3 illustrates one messaging flow for a robocall management system using a whitelist in processing a potential robocall.

A high level messaging diagram is shown in FIG. 3 of how this is accomplished. The messaging diagram 300 shows the terminating switch, which is the SSP switch serving the called party 150*a*, the SCP 120, the RCS 130, and finally the subscriber's telephone 110 all interacting by using the whitelist. The process begins when an incoming call to the subscriber 305 is received at the SSP switch 150*a*. The SSP switch 150*a* is configured to initiate a query. It may do so for all calls received for the subscriber, or it may do it for all calls except for those originated by the RCS to the subscriber. In either case, the query 310 is directed to the SCP 120 where the query includes the called and calling party number information. The SCP 120 then uses that and potentially other information to check the calling party number against various lists. In this embodiment, the processing involves checking the number against a whitelist associated with the subscriber. Assuming the calling party number is on the list, the SCP then sends a response 320 to the SSP switch instructing the SSP switch offer the call to the called party. In response, the SSP switch continues with setting up the call (i.e., ringing the phone) of the called party in operation 325. The overall time for this processing is minimal and is such that the calling party will not detect any appreciable delay.

The whitelist may be populated in various ways. In one embodiment, every outbound call originated by the subscriber results in that dialed number being added to the subscriber's whitelist. For example, if Subscriber A makes a call to Telephone Number X, then it may be presumed that Subscriber A expects to receive calls from Telephone Number X in the future. Thus, any subsequent inbound call from Telephone Number X should be offered to Subscriber A without any diversion. Thus, Telephone Number X will be placed in the whitelist to ensure this occurs. The SSP switch may add this number to the whitelist by sending a different message to the SCP after the call, or some other system may populate the whitelist with the dialed numbers.

There is the possibility that an illegal robocaller may spoof a robocall using Telephone Number X. Spoofing refers to the practice of originating a call using a CPN that is not associated with call originator. Illegal spoofing refers to the unauthorized use of another's CPN, coupled with the intent to deceive, defraud, or obtain something of value. It is possible that an incoming call to the subscriber may use a spoofed CPN that is on the whitelist that will result in that call being offered to the subscriber, where the subscriber did not want that call, including when that call is a robocall. However, as will be seen, there are methods for the subscriber to remove that number from the whitelist or for the serving carrier to remove that number from the whitelist without waiting for the subscriber to make such a request. If this occurs, the carrier may be able to detect the spoofing of that number from other sources, and place that number on the graylist for a period of time.

The whitelist may be populated with wildcards, so that any call from an NPA or NPA-NXX may be allowed to pass (e.g., offered to the subscriber.) This approach would screen many illegal robocalls that use an out-of-area code. Of course, illegal robocalls may spoof the same NPA-NXX as the called party, a practice called "neighbor spoofing." This practice is based on the result that a person would be likely to pick up a call from a number that could be, e.g., a neighbor, or someone else living close by. Again, such numbers may be allowed to pass if they are on the whitelist, but could be removed if neighbor spoofing became a problems. Depending on the frequency of this occurring, the subscriber may alter the wildcards. For example, subscriber could narrow the wildcard to a specific set of central office codes, or line numbers. In some cases, to address neighbor spoofing, the wildcard could allow all calls except those from the same NPA-NXX to be passed, and those with the same NPA-NXX would be treated as potential robocalls.

As will be seen, the whitelist may be managed by the subscriber, the subscriber's service provider, or potentially other entities. The subscriber may be able to review the listing of whitelisted numbers, add numbers, delete numbers, or move numbers to another list. The subscriber may also place a temporal treatment on a number. For example, the changes made by a subscriber may be temporary, for e.g., 1 day or 1 week, after which the change reverts back to its prior condition. This would allow the subscriber to temporarily delist a number from a whitelist and have it automatically relist itself to the whitelist. This allows a degree of control in defining how restrictive/unrestrictive illegal robocalls may be blocked.

Blacklists

The blacklist is a list of telephone numbers, wherein if the CPN of a call is on this list, the SCP will inform the SSP switch to not offer the call as normal. Typically, the response is to direct the call to the RCS. In some embodiments, the call could be simply blocked, but as will be seen, there is an advantage to directing the call to the RCS in case the call is a legal robocall. The blacklist may be populated in a number of ways. The serving provider may collect information about CPNs which are known to be associated with illegal robocalls. Thus, a number may be reported by another subscriber or entity as being associated with an illegal robocall and the serving carrier may add that number to the blacklist for the subscriber. In this way, the subscriber will gain the benefit of other subscribers reporting CPNs as being associated with illegal robocalls.

The blacklist may be populated using third-party crowd-sourcing mechanisms or from other carriers. There could be a national database for reported numbers of illegal robocallers. Such databases are compiled and released by the Federal Communications Commission ("FCC") and the Federal Trade Commission ("FTC") and developed by other third party providers. These 'robocall databases' contain information about telephone numbers reported as robocalls or otherwise illegal calls. Further, because many scammers spoof the calling party number, these numbers may be associated with another legitimate telephone subscriber. Adding that number to the blacklist would invoke RMS service processing on legitimate calls from the owner of that number. Thus, those calls from a live person could be diverted to the RCS. Thus, there has to be flexibility in how numbers are managed on any particular list.

Finally, the blacklist may be populated by the subscriber them self. In one embodiment, this is done by the subscriber interacting directly with the RCS, which allows the subscriber to report an allegedly illegal robocaller. The RCS could communicate this number to the SCP for inclusion on the blacklist. In another embodiment, the subscriber could also report this to the SSP switch after the call, which then reports the number to the SCP. The blacklist may be unique for each subscriber, or the numbers may be shared among all the subscribers of this RMS service by a serving carrier. Thus, there may be network-wide black list as well as a subscriber-specific blacklist.

Reference to a "blacklist" or "whitelist" should not imply any particular required implementation. In practice, a single list could be created, with a designation for each number as being on a whitelist or blacklist. Or, in other embodiments, separate lists could be identified. The concept of a "whitelist" or any other form of list is a logical construct that could be implemented in various ways.

An example illustrates the power of this mechanism to populate a blacklist. A robocaller originating illegal calls may call use a different CPN every day. On one day, they may call into various area codes serviced by a service provider. That service provider receives reports from subscribers that calls using that CPN are to be blacklisted. The service provider may populate that number onto the blacklist of other subscribers in other areas codes served by the service provider. Thus, if the robocaller uses the same CPN to call into another area code later that day served by the service provider, those subscribers will already have a current blacklist that will identify that CPN as a robocaller. Thus, as soon as calls are reported from a CPN as being a robocaller, all the subscriber's blacklists are updated.

It is possible that a robocaller may block their CPN in attempt to avoid processing by the service provider's robocalling management service. Thus, it would not be possible to ascertain whether the number is on a blacklist or not. In such cases, the SCP could be configured so as to always direct the SSP switch to route the call to the RCS if the CPN is not provided to determine whether the call is a robocall or not. In other situations, a call may exhibit a CPN that is not on the blacklist nor on the whitelist. In such cases, the SCP could be configured to treat the number on a default basis, e.g., as if it were either on the blacklist or the whitelist. (This could be considered a graylist.) Alternately, the call could be routed to the RCS for determination of what type of call it is, i.e., it is potentially a robocall that requires further confirmation of its status.

Graylist

It is possible for some, but not in all, embodiments, to define a "graylist" of numbers which are not approved for allowing the call to be offered (as are the numbers on the whitelist), but are not known as robocalls (as are the numbers on the blacklist). This could be a distinct list or the given status of numbers that are neither on the whitelist or graylist. Thus, the graylist could be simply a default for processing calls where the CPN is neither on the whitelist or blacklist, and hence are presumed to be on the graylist. Or, the graylist could reflect a set of numbers which are suspected to be from robocallers, but have not been ascertained. Numbers on the graylist may receive unique treatment relative to the other two lists. For example, numbers recently reported by a small number of subscribers as being from robocaller could be put on the graylist until it can be confirmed for certainty that the number is that of an illegal robocaller. Or, the graylist could have a transient nature, so that special treatment is provided for a limited time and the number is then treated as being on a whitelist or on some other default basis. Thus, a number placed on the graylist could be automatically removed or moved to some other list. The graylist could be subscriber-specific or network-wide.

As will be seen, the calls identified as having a number on the graylist could be sent to the RCS for specific processing. For example, the call could be answered and the resulting audio may be analyzed to determine whether the audio is from a live person or a pre-recorded announcement. Then, based on that determination, further actions could be taken. For example, if the audio is determined to be a recording, the call could be classified as a robocall and placed in the SCP's blacklist. This would result in the CPN being removed from the graylist and added to the blacklist. That way, the next time a call appeared with that CPN, there would no need to re-analyze the audio. It would be treated as a robocall. On the other hand, if the audio is determined to be from a live person, then number could be removed from the graylist and added to the whitelist. Then, a subsequent call from that CPN would be allowed to be offered to the called party.

Figure 4:
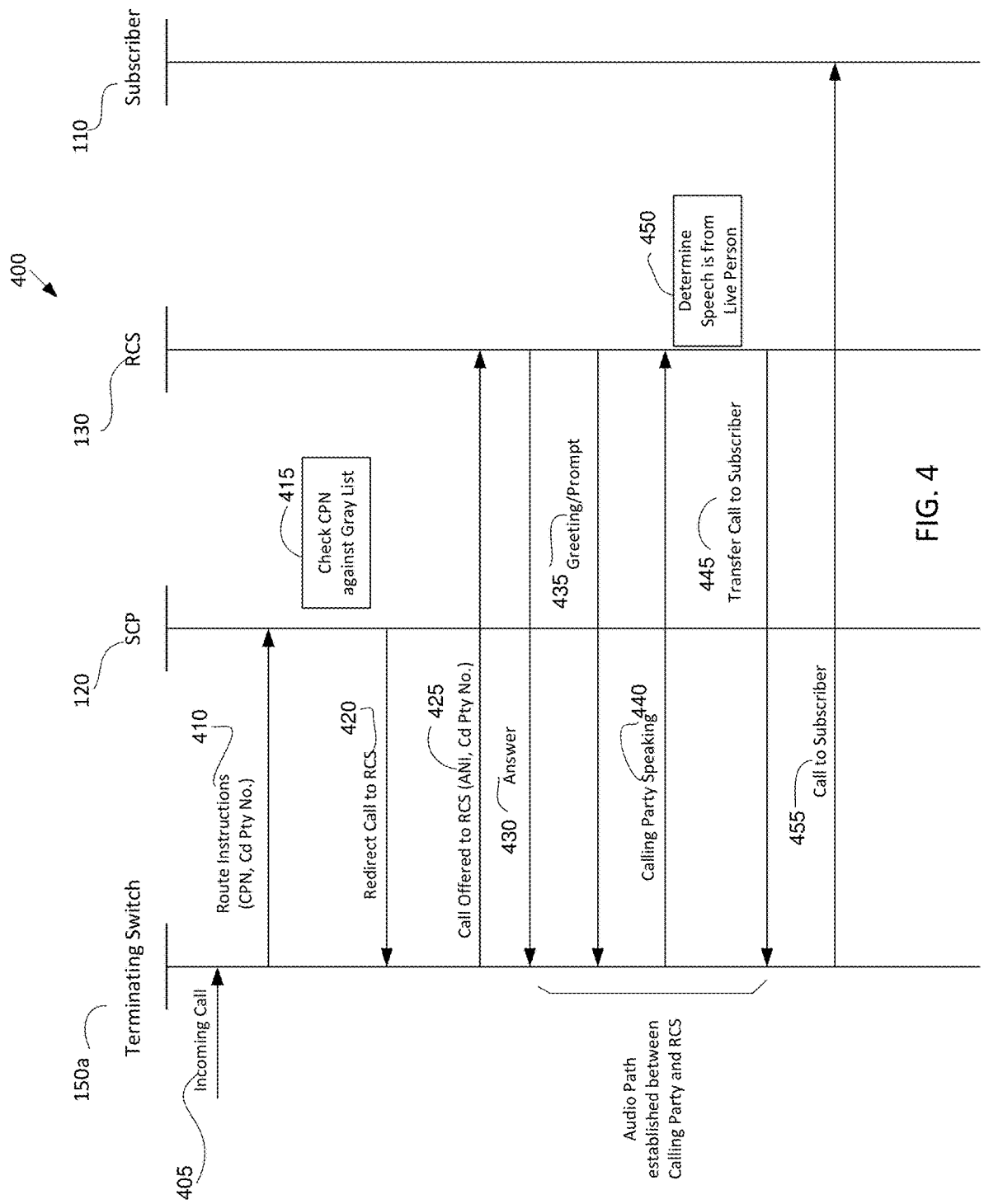
FIG. 4 illustrates one messaging flow for a robocall management system using a graylist in processing a potential robocall.

FIG. 4 shows one embodiment of a message flow 400 that may occur when processing involves a number on the gray list. This processing could apply to when using a blacklist as well, including in some embodiments that may not incorporate a graylist. The process begins with receiving an incoming call 405 at the terminating switch, 150a which is a SSP switch. The SSP switch 150a then launches a query 410 to the SCP 120, where the query includes the CPN and the called party number ("Cd Pty No."). The SCP then checks whether the CPN is indicated in a non-whitelist, such as a graylist or blacklist in step 415. The response 420 to the SSP switch by the SCP indicates the call is to be redirected by the SSP switch to a particular number of the RCS. The response 420 typically includes a telephone number of the RCS. That telephone number may be associated with certain type of processing in the RCS, such that any call directed to that telephone number receives the certain type of processing as discussed below.

The original incoming call 405 is then redirected in operation 425. This may be accomplished using call forwarding, which is a feature well-known to those skilled in the art of telephony. Thus, the original call becomes a diverted or forwarded call, although the same calling party is associated with both. Thus, reference to the "diverted call" refers to the forwarded call or any other equivalent functionality.

The RCS 130 answers the diverted call in operation 430 by returning an answering indication, which results in a two-way audio connection through the SSP switch between the RCS and the calling party. The RCS 130 may then provide a greeting/prompt 435 to the calling party via the SSP switch. The calling party may speak in response in operation 440, which is provided to the RCS. The RCS analyzes the speech in operation 450 to ascertain whether the calling party is a robocaller or a live person.

Reference the calling party broadly refers to the entity connected on the audio portion of the call, which could be a computer or a live person. Hence, if the call is a robocall, the caller is said to be a robocaller (i.e., a computer that is generating the recorded announcement). If the call is not a robocall, then the caller is a presumed to be a live person. Hence, reference to the "caller" or "calling party" should not be construed as a presumption the caller is, or is not, a computer/live person.

The RCS can ascertain a likelihood of the calling party being a robocaller or a live person based on the audio from the calling party after the prompts or welcome greeting is played. The welcome greeting may be more than just a simple greeting, but may inform the calling party that the purpose of the greeting is to ascertain whether the calling party is a robocaller or a live person, and hence it may include a simple prompt to the calling party to respond to. The response from the calling party could be speech or a DTMF tone. The type of response required is self-evident from the greeting, such as "state your name" or "press 1 to indicate you are a live person." The audio received by the RCS after the greeting is played to the calling party is analyzed to determine whether it is responsive. If, for example, the caller is a robocaller, then likely it will be playing its recorded announcement to the RCS before, during, and after the RCS is providing its greeting. Thus, the RCS will likely not receive a DTMF response, nor receive a short audible response to the question. Specifically, if the RCS prompts the caller for their name, while during this time and for 25 seconds after the prompt, audio is provided by the caller, then the RCS can ascertain the audio is likely not responsive to the greeting, but likely a robocall recorded announcement. In fact, if the RCS detects a continuous audio from the caller while it play the initial prompt, a robocaller may be presumed, since it is the cultural norm that when placing a telephone call, the calling party waits for the called party to say "hello" or something similar before speaking.

If the RCS determines the speech is from a live person in operation 450, then the RCS transfers the call via the terminating switch (i.e., SSP switch 150*a*) to the called party (i.e., the subscriber of the RMS service) in operation 445. In response, the call to the subscriber 455 is established. That call to the subscriber will reflect the calling party number of the original call, so that the subscriber is provided with information reflecting the identity of the calling party on their caller ID device, if they have one.

RCS

The RCS is a component that is able to receive a redirected call from the SSP. The call may have originated using a CPN known to be a robocaller (legal or illegal) or a CPN that is possibly from a robocaller (a potential robocaller). In other words, the RCS may receive what is expected to a robocall or may receive a potential robocall call that should be processed to determine if it is actually a robocall. The RCS may be implemented using a modified interactive voice response unit or a service node as those skilled in Advance Intelligent Network architecture would know, or some other device configured to perform the functions disclosed herein. The RCS may also incorporate a speech analytics component that analyzes the audio to ascertain whether the recording is the same as other recordings from other calls reported as a robocall or to analyze the semantics of the speech. The RCS may also determine whether the audio is that of a recording or from a live person. Thus, the RCS can be any device that can answer the call, process in-band audio information, and perform logic processing. The RCS may also report back its determination to the SCP. This can occur via an IP-based communication over the Internet.

Upon answering a call, the RCS may play an announcement indicating its purpose is to screen out robocallers. Otherwise, the RCS may merely answer the call and ascertain if there is a pre-recorded announcement being played. If so, it may store the recording in association with the subscriber it was directed to, so that the subscriber can subsequently review the call recording. These different call processing flows can be associated with different telephone numbers of the RCS. For example, the SCP could divert a call to a first telephone number of the RCS that is configured to merely record audio, or the SCP could divert the call to a second telephone number of the RCS that prompts the caller and analyzes the response to ascertain if a live person is on the line.

There are various ways known in the art that the RCS can ascertain if the caller is a live person. One approach is for the RCS to play an announcement prompting the caller with a simple question. The prompt may be structured so that the response is expected to be a verbal response or a dual tone multiple frequency ("DTMF") response. The question may be, for example:

What is the name of the person you are trying to reach?
What is day is today?
What is today's date?
Please indicate your name, so that I can inform the called party who is calling.

Typically, if the caller is an illegal robocaller where an announcement is played upon the call being answered, the robocaller call origination system will not be able to properly respond to the question. The announcement may simply keep playing while the RCS is playing the prompt. This allows the RCS to determine that it is not a person speaking, but a computerized or pre-recorded announcement. The RCS may employ speech analytics to analyze the speech of the caller to aid in this determination. For example, asking the caller to speak the current day would require speech analytics to analyze the spoken response. In another embodiment, the RCS may simply determine that the presence of audio by the call originator while providing the prompt is indicative of a robocall.

If the call involves an actual person, then the person will likely stop speaking once the RCS plays a prompt, and will respond to the prompt. Thus, their audio will have a shorter duration than a robocall announcement. Finally, the RCS may also analyze the contents of the caller's response to ascertain whether they properly responded to the prompt. If the caller is a live person, the limited short duration of audio in response to a prompt is by itself suggestive of a live caller. Typically, the cadence of speaking, pausing, listening, and answering is indicative of a live person. Further, if the calling party answers the question properly, then this further suggests the presence of a live caller. This depends on the nature of the question and may require speech analytics to analyze the subject matter.

If the RCS determines the caller is a live person, it will inform the caller that the call will be now directed to the called party, and to please hold. The RCS will then establish a call to the called party, and transfer the call (which was previously diverted to the RCS) to the called party. As will be explained later, the call attempt by the RCS is offered to the called party, because the serving carrier knows that calls from the RCS are always to be offered to the called party (the subscriber). This is because the originating telephone number from the RCS is on the subscriber's whitelist. (In another embodiment, the SSP switch may be configured to not trigger the query to the SCP when the CPN of the RCS is observed.) If the called party is not available (e.g., not answering or already on the phone), the call from the RCS may be forwarded to a voice mail system or answered by an answering machine as normal.

To prevent scammers from using the RCS's number (and therefore having their calls always offered), the SCP may further qualify calls to the called party based on a relative time of when the last call to the called party was detected and diverted to the RCS's number. For example, if a call from Telephone Number X is directed to the subscriber, the SCP will know that a call just occurred from Telephone Number X, and the SCP may divert the call to the RCS. The SCP will know that if the RCS determines the call to be from a live caller, that a second call to the subscriber will be originated, this time originating from that RCS's number. Thus, whenever a call is originated by the RCS to the subscriber, there should have been a recent prior call to that subscriber and an indication in the SCP's records that the call was diverted to the RCS. The arrival of a call using the RCS's phone number that is not preceded by an immediately prior call (e.g., within the last 60 seconds) is symptomatic of a call that has spoofed the CPN of the RCS.

The RCS may know whether the subscriber is on a national/state do not call ("DNC") list and therefore should not receive unsolicited telemarketing calls. If the RCS knows the call involves a live person, and the RCS determines that the CPN is from a business, the RCN may inform the caller that the subscriber is on the DNC list, which further discourages the caller from contacting the subscriber. The RCS may further confirm that the call is not a telemarketing call. This can be done by offering a simple prompt to the caller asking them to acknowledge that the call is not a telemarketing call. Thus, the RMS may also function to reduce unwanted telemarketing calls from callers using live agents (non-robocalls). The RCS may ask the caller to confirm that this is not a telemarketing call by responding verbally or by providing DTMF tones. If the caller is unable to do this, then the call may be directed to the subscriber's voice mail service immediately.

If the RCS determines the caller is not a live person, that is, it is a robocall that involves a pre-recorded announcement being played, the RCS may record the announcement for subsequent subscriber review. This allows the announcement to be provided to the called party in case the announcement is not from an illegal robocaller and contains important information the subscriber desires to know. Not all pre-recorded announcements automatically provided on calls to the subscriber are illegal robocalls. There may be various applications where the subscriber provided consent, and expects to receive pre-recorded announcements. Such calls are often used to provide information to the subscriber, such as school closings, emergency power shutoff notifications, prescription refills, airline schedule changes, etc. Thus, a mechanism must be in place allowing the information from a recorded announcement to be preserved in the situation where the RCS is unable to ascertain whether the pre-recorded announcement is a legitimate call or an illegal robocall.

In some embodiments, the RCS may not record the announcement. For example, if the CPN is from a known illegal robocaller, and indicated on the blacklist, the RCS may not record the announcement at all. Or, the RCS may temporarily record the announcement and analyze it to determine if it is a clear illegal telemarketing announcement, and once so determined, it discards the announcement. For example, many illegal mass robocalls use the same announcement. If the recording is deemed to be the same, then the RCS may not record the announcement or simply process the announcement so as to maintain a text transcription for future use. In this manner, the RCS is not consuming memory or storage for maintaining unwanted robocall announcements.

Thus, upon determining the call involves a pre-recorded announcement, the RCS may store the recording. In various embodiments, the RCS may employ speech analytics to determine the contents of the message. It may generate a transcription of the announcement. The RCS may consult a list of numbers (CPN values) that are authorized by the subscriber to leave announcements. Thus, the subscriber can indicate, for example, the airline's number so that any prerecorded messages are stored in the RCS for future access and review. These numbers may be stored in separate whitelist maintained by the RCS. Alternatively, the number maybe indicated in a "graylist, which may comprise numbers that are not explicitly authorized by the subscriber, but known to be legitimate originators of recorded announcements, such as schools, airlines, utility companies, etc.

Figure 5:
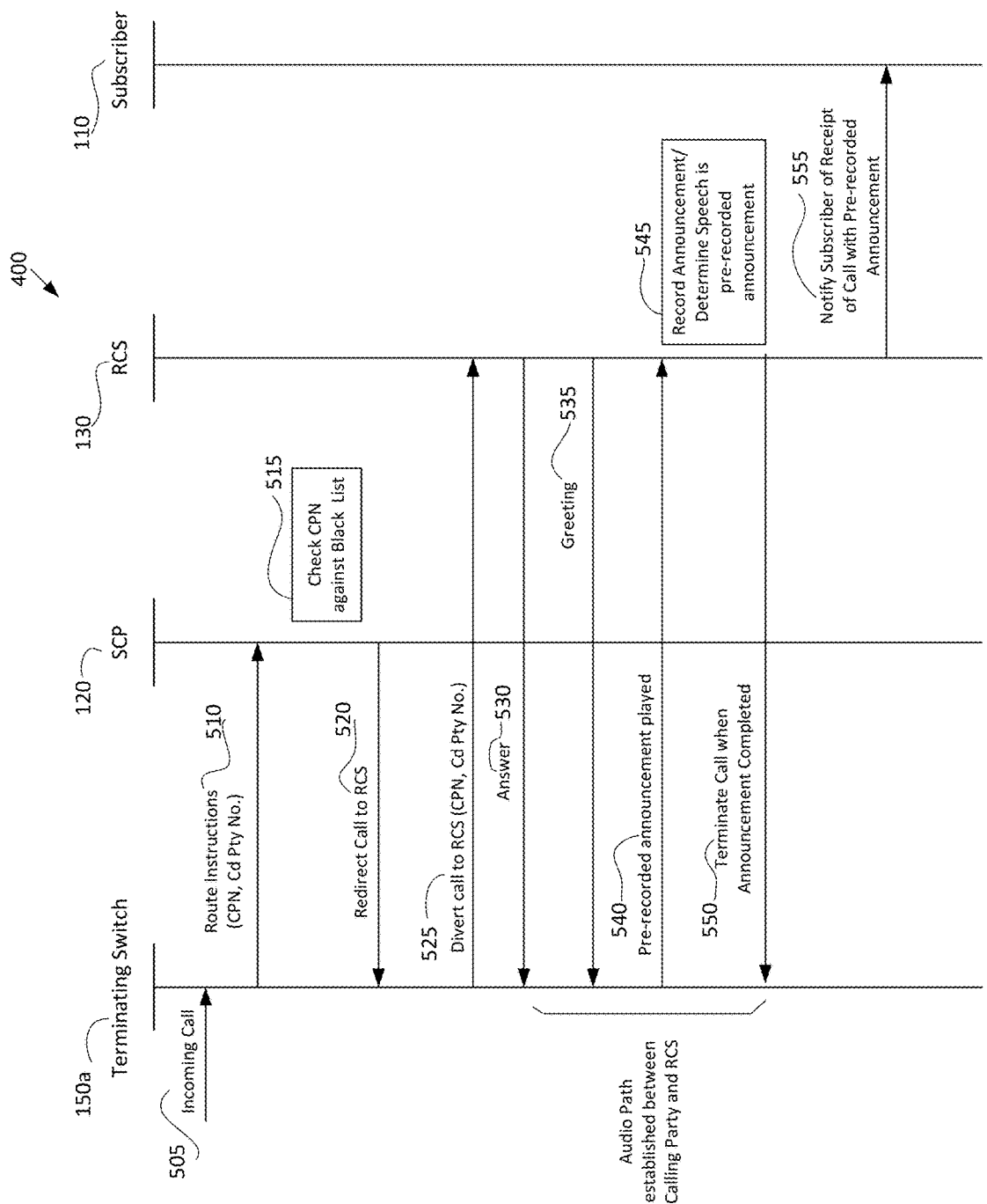
FIG. 5 illustrates one messaging flow for a robocall management system using a blacklist in processing a potential robocall.

An illustration of this shown via the messaging diagram of FIG. 5. Turing to FIG. 5, the process begins with receiving the incoming call, which indicates a calling party number of the caller. This results in the terminating SSP switch 150a sending a query to the SCP 120, where the query indicates the CPN (calling party number) and the Cd Pty No. (called party number). The SCP then, in operation 515 uses the CPN to check whether the number is on a whitelist, blacklist, or perhaps a graylist. Assuming that the number is found to be on a blacklist, the SCP will response to the query 520 indicating the call should be forwarded/redirected to the RCS. Thus, terminating SSP switch 150a will divert the call to the RCS. The diverted call in this case reflects the calling party number that was the same value as in the original call and reflects the called party number of the original call as well.

The RCS 130 answers the call and may provide a greeting 535 to the caller. If there is a high likelihood of the call being a robocall, then the RCS may not even provide a greeting, or a minimal greeting. The caller, assuming it is a robocaller, will play its recorded announcement 540 once the call is answered. The RCS may record this in operation 545. The RCS may record the announcement in case the subscriber desires to later review the announcement. The RCS may further analyze the speech and compare this recording against known other robocall recordings. If the RCS determines it is the same recording, it may terminate the call sooner, or may wait for the announcement to complete and then terminate the call in operation 550.

The RCS may then notify the subscriber of the receipt of the robocall in operation 555. If the call is known to be an illegal robocall, the RCS may not immediately notify the subscriber. Rather, the RCS may notify the subscriber on a set schedule, e.g., once a day, after several days, or once of week of all illegal robocalls received. In some embodiments, the RCS may not even store the recording for known illegal robocalls, and may not even inform the subscriber of illegal robocalls. The RCS may be configured to inform the subscriber of legal robocalls and not inform the subscriber of illegal robocalls. Further, the RCS may be configured to inform the subscriber relatively promptly of legal robocalls and only periodically inform the subscriber or illegal robocalls. In this way, the RMS system can distinguish between known illegal robocalls and legal robocalls with respect to its reporting to the subscriber.

For example, the called party (subscriber) may be provided an announcement of a change in airline flight status, which may be very important to the subscriber, but the subscriber did not remember to explicitly place the airline's CPN on the whitelist. Likely, the airline's number would not be on a blacklist. Thus, the number may be on neither and presumed to be on a graylist. In some embodiments, the graylist is not an actual list of numbers, but a status of a number representing that it is not either the whitelist or blacklist. Or, a graylist could be an actual list of numbers where the status is unclear (e.g., neither clearly allowed nor prohibited, but potentially suspect) and treated differently than numbers which are on none of the lists. However, the RCS may determine that the CPN is that of an airline, and presume that the airline is authorized to leave a pre-recorded message. Thus, this number may be on the graylist.

The RCS may ascertain a likelihood (reflected in a score) that the recorded announcement is associated with an illegal robocaller or a legitimate caller. A variety of methods can be used to determine a relative likelihood, which can be expressed by a "robocall score." For purposes of illustration, the value could be zero to 100, where 0 is likely legal robocall, and 100 is likely an illegal robocall (or vice versa).

One way to determine this is to analyze the frequency of the CPN and correlate it with prior complaints of robocalls. However, some robocallers rotate usage of their CPN over a time period. Some may even use a neighboring spoofing technique, which changes the CPN on a per call basis based on the called number. However, even if this is done, some large-scale scam operations originate a large number of calls using the same announcement. Many people have received, for example, a call with an announcement from "Rachel from cardholder services." A carrier would likely receive many complaints or indications from subscribers that the call was an illegal robocall. These calls may have different CPNs, but the announcement is the same. The RCN could store the recording and compare it with other stored recordings that have been recently reported as robocalls. This could allow a determination that the call is an illegal robocall. The RCN could then process the call accordingly.

In one embodiment, if the RCN determines the call is highly likely to be an illegal robocall, then it could discard the recording. Or, if the RCN determines the call is likely a robocall, but not necessarily an illegal one, it could preserve the recording for future inspection by the subscriber. In other embodiments, the RCN could preserve the recording for manual inspection to verify whether that would likely be an illegal robocall. If the score indicates the call is likely a legal robocall, then the subscriber could be informed of the call. Further, if other subscribers report that the recording is of an illegal robocall, the RMS could subsequently alter the determination of other subscribers who have received the same announcement.

The robocall score can also be used to inform the subscriber of the likely nature of the announcement (e.g., is the pre-recorded announcement likely an illegal robocall or not). The RCS can then inform the subscriber of the presence of the message in a number of ways, including by sending an email, a text, or other means. These messages can include a reflection of the determination or likelihood that the call is an illegal robocall.

If the RCS determines the call is likely legitimate, the RCS may place a call to the subscriber, and play the announcement. The RCS may preface the announcement with a prompt reporting that a pre-recorded announcement was received, and the likelihood that it is a legal robocall. The subscriber may listen and perform functions to erase the recorded message, replay, or store the announcement. Storing the message may be provided in conjunction with the subscriber's voice mail service, or as a separate message storage/retrieval service. Similarly, if the call is suspected to an illegal robocall announcement, the subscriber may be informed as such. The subscriber could also provide an indication confirming the determination or an indication reporting the call was an illegal robocaller, which would result in blacklisting or graylisting that number.

When the RCS places the call to the subscriber, the caller ID (i.e., CPN) may be that of the RCS, so that the call is allowed to be directed to the subscriber. This can occur several ways. First, the SSP originates a query where the number of the RCS is indicated as the CPN, and since the RCS is on the whitelist, the call is allowed to be offered. Second, the SSP can be configured so that it will trigger the query to the SCP for every call but those from the RCS. That is, the SSP can have its own 'whitelist' which is used to bypass the sending of the query. Third, the SCP can be configured to authorize the call from the RCS that indicates the CPN only if the SCP just prior to that call instructed the SSP to divert a call with that same CPN to the RCS.

In some embodiments, when the RCS originates the call to the subscriber, the CPN indicates to the subscriber will be that of the RCS. This allows the subscriber to know the nature of the call; e.g., the call is from the RCS reporting receipt of a recorded call. In this way, the subscriber can receive calls comprising recorded messages in real time (i.e., as the recorded is being played to the RCS or shortly after the call), without the recording being automatically discarded, and therefore preserving the subscriber's control of potentially hearing the announcement. Because the determination of whether an announcement is associated with a legal or illegal robocall, it is desirable that all announcements are recorded for subscriber review. In other embodiments, the RCS will use its CPN only for reporting illegal robocalls and use the CPN of the legal robocaller when reporting legal robocalls.

The RCS may inform the subscriber of having detected calls having pre-recorded announcements in different ways, based on whether the RCS determines the call is likely to be an illegal robocall versus a legitimate call. Illegal robocalls (or those thought to be) may result in informing the subscribe using a text message or email message, along with an indication of the likelihood of the call announcement being an illegal robocall. The text/email may include a link to hear the announcement. On the other hand, legitimate robocalls may be notified via a voice call in addition to the previously identified ways. In other embodiments, the legitimate robocalls may be offered both via voice call and text/email notifications. Further, the timing of when the subscriber is informed of the recorded message may vary based on whether the call is determined to be an illegal robocall or a legal robocall. Illegal robocalls may be reported to the subscriber on a batch basis, periodically. For example, every day or week the subscriber could receive an email listing the illegal robocalls received. On the other hand, the subscriber could receive individual text messages for reporting legal robocalls with minimal delay. In this manner, the subscriber is still informed of information that may be critical timewise. The notifications may even include a text translation of the announcement. This would allow the subscriber to quickly ascertain whether the full recording should be reviewed.

Subscriber List Management

A subscriber can request a number for inclusion on the whitelist, blacklist, or the graylist. If the treatment of an incoming call based on the CPN by the RMS is acceptable to the subscriber, then no further specific action has to be taken. For example, an incoming call from a live person (from a certain CPN) can be expected to be allowed to be offered in the same way in the future. Similarly, the subscriber will know that any outgoing calls to a number will result in that number being allowed to be offered. If, however, a call is offered, which was inadvertently determined to be live person, but is not, then the subscriber may desire to explicitly define the numbers on one of the lists. The serving carrier may provide a website for allowing the subscriber to access, review, and edit each list. These website would allow the subscriber to review and edit the contents of the various lists used by the SCP for that subscriber. For purpose of such edits, the lists edited and reviewed by the subscriber would be lists applicable for that subscriber (e.g., the subscriber could not directly alter the lists of another subscriber). However, the carrier could use information from that subscriber, along with other subscribers, to determine certain numbers that should be added to everyone's blacklist because that number is commonly reported as a robocaller.

In addition, mechanisms may be provided allowing the subscriber to add the number for a current or recent call to one of the lists without having to access a web site. For example, an incoming call may be from a live person who is not on the whitelist, blacklist, or graylist. Such a call may be routed to the RCS for confirmation that the caller is a live person, and upon determining there is a live person, the call will be transferred to the subscriber. The subscriber may engage with the person, and after completing the call, may invoke a service by pressing a sequence of DTMF digits (e.g., similar to a so-called "star code" or some other value), which the serving carrier's SSP switch interprets as a request to place the last incoming CPN on the whitelist (or other list, such as the blacklist). In another embodiment, the SSP switch could automatically place the CPN of an incoming call that was answered, and which lasted longer than a certain time limit, onto the whitelist. The theory is that if the call was a robocall, the subscriber would answer the call, quickly ascertain the call was a robocall, and hang up. Typically, this process takes less than 10-30 seconds. However, if the caller is a live person, then frequently, the length of the call will be more than 10-30 seconds. (Of course, a wrong number from a live person may last less than 10 seconds.) Thus, the SSP can conclude that answered calls of a significant duration, that is, longer than 10 seconds, can be presumed to have involved a live person, and therefore the CPN of that call is not a robocall. Any outgoing call by the subscriber to a number may also result in that number being included on the whitelist.

The sequence of events would be similar if the call was from a source that provided a pre-recorded announcement and the caller does want to receive such calls in the future. The subscriber would get a call from the RCS, and may optionally inform the subscriber of receipt of a pre-recorded announcement type of call. In this case, the RCS could prompt the subscriber to affirm that the number should be added to the whitelist. The subscriber could affirm verbally or via DTMF entry, and the RCS could inform the SCP to place the indicated number on the whitelist.

Similarly, the subscriber could explicitly add a number to a blacklist by accessing a web site allowing management thereof, or by invoking a "star code" (e.g., a sequence of DTMF digits preceded by a star key) after a call that signals to the serving carrier SSP switch that the CPN for the last incoming call should be placed on the blacklist. The SSP switch would then indicate the number to the SCP. Thus, if the subscriber gets a voice call that is from a live person that they do not want to receive any future calls from, or gets a call that is a robocall that was not determined to be a robocall, or gets a call that the RCS incorrectly determined to be a live person, then the subscriber can ensure that no further calls are offered to them from that CPN. The subscriber, however, will receive notifications from the RMS that a robocall was detected and the recording captured. Thus, the RMS can be used by a subscriber to also block calls from a live person by indicating that CPN is from a known robocaller.

Numbers may be added to blacklist by the subscriber's provider by analyzing other subscriber's actions. For example, if subscribers in a certain area (a geographical area, city, etc.) are adding a certain number on their respective blacklists, then the service provider may then determine at a certain point that the number should be added to other subscriber's blacklists, since that CPN is likely to reflect an illegal robocall. One way of implementing this is to define subscriber-specific blacklists and a network-wide blacklist. Thus, the serving carrier would populate the network-wide list, and allow the subscriber to populate and edit their subscriber-specific blacklist. The network wide list is similar to "crowdsourcing" information, where the collective action of other subscribers is used to ascertain whether a CPN is being used for illegal robocalls.

In another embodiment, when the RCS calls the subscriber and plays the announcement from a particular call, the RCS could ask the subscriber to confirm whether the RCS should treat other calls from this CPN as a legitimate call or an illegal robocall. If the latter, then that information could be used to modify the lists of other subscribers.

Contact Center Management

Contact centers, or other originators of legitimate robocalls that play an announcement for the called party (simply collectively referred to as "contact centers" herein), may request the serving carrier place their calling telephone number on the whitelist. Presumably, the request to place the number will be vetted to some extent by the serving carrier, and it is unlikely that an illegal robocall originator will make such a request. This may require the requesting entity to provide contact information that can be verified by the RMS operator prior to allowing numbers to be put on the whitelist, which illegal robocallers are hesitant to provide.

In some cases, the CPN used when originating calls by the contact center may not be placed on the whitelist for various reasons, but may be on a graylist. The contact center may ascertain that their call are being processed by the RCS by detecting the call being answered by the RCS. If the RCS records the call, it may inform the caller that the RCS is recording the call via a greeting/prompt. If the RCS is prompting the caller to ascertain whether it is a live person, the contact center can detect this type of prompt. One way may involve using speech analytics to detect the prompt. Alternatively, the contact center may connect an agent to connected calls, and the agent would hear the prompt. The agent could respond and thus indicate to the RCS that the call involves a live caller. Or, the agent could disposition the call as having encountered an RCS. In either case, the contact center would be aware of the treatment received.

Likely Response from Illegal Robocallers

If illegal robocallers used their assigned CPN, then the above scheme will result in such calls being identified as being from a robocaller, and eventually that number will find its way on the blacklist, either a subscriber-specific blacklist or a carrier wide blacklist. Once on the blacklist, subscribers to the RCS service can expect such calls will be diverted. Eventually, it can be expected then, that illegal robocallers will respond by then "spoofing" their CPN so that the inaccurate calling party information will be used. Of course, if scammers originating robocalls consistently use a different CPN, then that number will eventually wind up on the blacklist. It is only when the scammer uses a different number for each call, which has not yet been placed on the blacklist, can the scammer avoid the corresponding treatment for blacklisted numbers.

Thus, one approach illegal robocallers may employ is to use a new and different CPN for each call. This will likely result in an incoming call to the RMS, with an unrecognized CPN, that is neither on the Whitelist, nor has been recognized and placed on the Blacklist. The number may or may not be on a separate graylist. The number may simply be that of another residential number selected in a pseudo random manner, even in the same local area as the subscriber The SCP can utilize algorithms for determining a likelihood of such numbers. The subscriber may indicate different thresholds that the SCP may apply based on how aggressive the illegal robocallers are and how aggressive the SCP should presume a call is a robocall. In one embodiment, the SCP could treat any number that is not on the whitelist as being on the graylist and subject to confirmation. A less aggressive approach is that if number is on not on a whitelist, nor blacklist, then the call is offered to the subscriber without being diverted to the RCS on the presumption they are not a robocall. The subscriber can then report it, and it will be placed on the blacklist, or alternatively, a graylist. If this assumption proves incorrect to the point it is unacceptable for the subscriber, then the presumption can be adopted by the SCP that any call not on the whitelist must be diverted for verification by the RCS.

Recall that the SCP may place the numbers dialed by the subscriber in the whitelist. Those numbers, if spoofed by the scammer, would be offered to the subscriber. However, that occurrence is relatively unlikely. Rather, if the robocaller used a random neighbor spoofed number (i.e., one in the same area code and central office code) then that number would likely not be on the whitelist. In that case, the SCP could presume that such "local" numbers would be a potential robocaller. In such cases, the number could be routed to the RCS system for confirmation whether a live person is calling. If the call plays a pre-recorded announcement, then the announcement will be recorded, and the subscriber will be informed of the occurrence of an incoming call that had a pre-recorded announcement. The subscriber may also be informed that the call is likely an illegal robocall, based on various ways that the RCS may classify the announcement. The subscriber has the option of hearing the announcement, or discarding it. Thus, the effect is that the subscriber will still be informed of the call, which may or may not have actually been an illegal robocall, and can opt to not listen to it. If the subscriber is not sure whether they need to hear the message, they can then listen to the message, but have it deleted. The subscriber can also indicate whether the call was an illegal robocall or a legal robocall. That way, in the future, the RCS could inform the subscriber in a timely and/or different manner based on the subscriber's indication. Thus, messages are not discarded without the subscriber's knowledge.

Illegal robocallers may try to learn of numbers on the subscriber's whitelist and attempt to spoof one of the numbers on the whitelist. If they do so, then such calls will initially be offered to the subscriber. But, in such cases, the subscriber would then report that number as being from an illegal robocaller, and that number would be removed from the whitelist and added to the blacklist or graylist. The next time the robocaller uses that CPN number, the call will be routed to the RCS. Thus, the illegal robocaller would likely stop using that number.

The legitimate owner of that number (which was spoofed), which has been moved from the whitelist to the blacklist/graylist would then have their future calls diverted to the RCS. This would impact the legitimate owner of the number, and if such calls were voice calls involving a live caller, the RCS would detect this, and the call would be forward it to the subscriber. The legitimate owner could request that the subscriber place that number back on the whitelist. The algorithm for detecting such semi-random CPN selection may know that the robocaller would not immediately use that same CPN again in the near future. The algorithm in the SCP could, e.g., automatically remove that number from the blacklist to the graylist, or from the graylist to the whitelist after a set amount of time, e.g., after a few days.

On the other hand, if the legitimate owner of the CPN is a legitimate originator of pre-recorded announcements (a legal robocaller), then such announcements would be detected by the RCS, and the subscriber would be informed of the presence of an incoming call with a pre-recorded announcement, and would be informed of it in some manner. Thus, the pre-recorded information for a legitimate robocall would not be lost to the subscriber As evident, the RMS is designed to be flexible and adaptable. An illegal robocaller using a single CPN will eventually be identified as a robocaller by the RMS and their calls will be routed to the RCS. The robocaller may attempt to adapt by altering their CPN, either by spoofing a legitimate number or using another random number, but that too, will be determined to be from a robocaller eventually, as greater use of that number occurs. Even if the illegal robocaller alters their CPN, it will be detected and eventually routed to the RCS. A more aggressive approach for processing calls, wherein calls are more likely to be routed to the RCS than not, means that more calls involving live callers will be routed to the RCS. However, for these callers, there is a slight additional time in interacting with the RCS, but their call will be transferred to the subscriber, so that they will still be able to speak with the subscriber (or leave a message on the subscriber's voice mail or answering machine). The only way which it appears a robocaller would consistently get through is to call a subscriber each time using a different number on the subscriber's whitelist, which seems unlikely that the robocaller could do without prior knowledge of that subscriber's whitelist.

Application of Speech Analytics

A common aspect of many illegal robocalls is that they utilize the same pre-recorded announcement for a large number of calls. When a robocall is processed by the RCS, it may apply speech analytics to analyze whether the announcement provided by the caller is the same as other announcements which have been processed, and which were verified as being an illegal robocall. If so, then the RMS will be able to characterize the announcement as an illegal robocall with greater certainty. In various embodiments, the RCS may be configured to block the call from being offered to the subscriber, and may not even inform the subscriber in real time or otherwise of the occurrence of the call. In other embodiments, the RCS will inform the subscriber of the call, with an indication that is likely an illegal robocall.

Subscriber's Voice Mail

The subscriber may have a network-based voice mail service or an answering machine ("ASM"). Thus, anytime a call passes through the whitelist, the call is offered to the subscriber in a normal manner. If the subscriber has voice mail service or ASM, then the caller's message (comprising the pre-recorded announcement) may be recorded in a normal manner. As noted earlier, the voice mail system may be integrated with the RCS, since both involve recording messages, offering indications to the subscriber, and allow the subscriber to review, delete, or save the message. As noted earlier, though, a voice mail system is not the same as the RCS.

If the call is a robocaller, it will be detected and the RCS will record the announcement. The RCS may store detected pre-recorded announcements on a temporary basis for the subscriber, so that the subscriber has the option of receiving the information. Thus, the storage of the pre-recorded announcement can be viewed as a special form of message storage service. As with voice mail service, a notification of a newly recorded message is provided to the subscriber. The subscriber can hear the message, see a transcript of it, delete it, or in some embodiments, save it. In some embodiments, the serving carrier may elect to use some of the same VMS infrastructure for storing pre-recorded announcements for the subscriber.

Contact Center Override

Legitimate contact centers may know that a particular subscriber or carrier has the RMS service, but the contact center's CPN may not be on the subscriber's whitelist. It may be that the contact center was unable to, did not register, or otherwise did not cause their CPN to be registered on whitelist. Or, it may be that the CPN was removed from the whitelist because an illegitimate robocaller has been spoofing that CPN. In cases where calls from the legitimate contact center operation are directed to the RCS, the call originator will know that this is occurring. In one embodiment, the call originator may enter an override code to bypass or abbreviate normal RCS treatment (effectively, treating that call as if the number had been on the whitelist).

Assuming that the call is redirected to the RCS, which answers the call and is configured to ascertain whether a person is present, the contact center may provide the override code to the RCS, which could be provided via DTMF or via a particular phrase. The codes may be altered periodically and there may be a 'back-channel' for the contact center to communicate and obtain periodic updates of the current override code from the RMS. If the code is correct, then the RMS would bypass the remainder of the confirmation processing in the RCS for that call, and either transfer the call directly to the subscriber (or immediately proceed to record the pre-recorded announcement and notify the subscriber). If the confirmation code is incorrect for that CPN, the call could be terminated. This situation may reflect an illegal robocaller attempting to guess at the override code. By terminating the call, the illegal robocaller will be discouraged from trying to guess override codes, because the call is answered (incurring a cost to the illegal robocaller for a call completion) but then the call is terminated, without the announcement ever being heard by the subscriber, which represents a net loss for the robocaller. Further, incorrectly guessing the override code could result in that CPN being added to the blacklist, which may prelude subsequent use of the override code.

Figure 6:
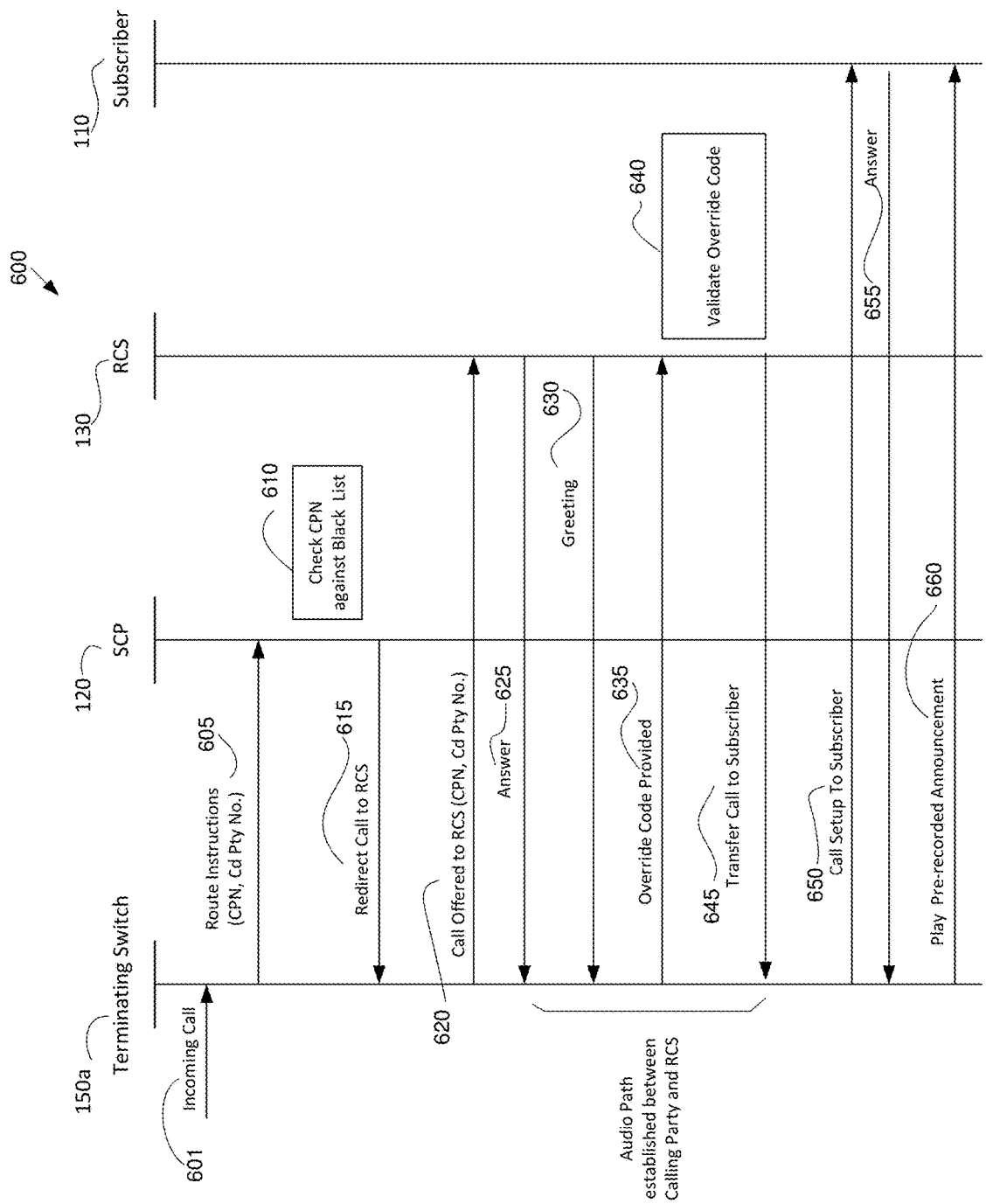
FIG. 6 illustrates one messaging flow for a robocall management system processing an override code when processing a potential robocall.

One such message flow illustrating use of the override code is shown in FIG. 6. Turning to FIG. 6, the message flow 600 begins with an incoming call 601 received. The terminating SSP switch 150a initiates a query 605 to the SCP 120. The SCP 120 checks the CPN in the query of the incoming call against a blacklist (or a graylist) in operation 610. The result is that the SSP switch 150a is instructed in a response 615 from the SCP to redirect the call to the RCS. The redirected call 620 is originated to the RCS 130, which then provides an answer indication 625 and the call is connected. The RCS 130 then provides a greeting 630, which may simply inform the caller that the call is being treated as a robocall. The contact center then enters the override code 635 which RCS receives and validates in operation 640. If the code is valid, then the RCS transfers the call to the subscriber in operation 645. The transferred call 650 is then established to the subscriber, which answers the call in operation 655. At this point, the calling party plays the prerecorded announcement 660 to the subscriber.

The contact center may have to be configured to detect the greeting 630 provided by the RCS. By so configuring the contact center originating legitimate robocalls, the contact center can avoid being treated as an illegal robocall originator. The contact center upon detecting the greeting 630 would not play the announcement, but would instead convey the override code, which could be a speech recording or a DTMF code sequence, which would then result in the call being connected to the called party. Then, upon detecting a greeting from the subscriber, the contact center could then start playing the prerecorded announcement. If the contact center played the announcement and continued to do so without detecting the RCS greeting, the robocall announcement would be lost, and the subscriber may not hear all of it. Thus, for example, if the robocall announcement were to inform the subscriber of a delayed flight or upcoming appointment, then most of the critical information would be lost if the announcement were not delayed appropriately.

The provision of the override code is coordinated between the serving carrier and the contact center, which allows another path of management of how robocalls are processed. This channel of communication is separate from the subscriber's ability to communicate with the RMS provided and move numbers between the various lists. Thus, there is a management mechanism between the contact center and the serving carrier, and between the subscriber and the serving carrier.

In the case of the call being transferred from the RCS to the subscriber, the CPN for this call will typically reflect that of the calling party (i.e., in this case, the value used by the contact center) and not the RCS. That is, the call is from a legal and wanted robocall to the subscriber and the RMS system attempts to make its involvement appear transparent. Thus, the CPN provided to the subscriber in cases where the contact center has entered a valid code is the same CPN as in the original call.

If the contact center does not enter an override code, or enters an invalid code, then the call is not transferred to the subscriber, and the RCS may record the announcement as it would for an illegal robocaller. The RCS may further report the CPN for inclusion in the blacklist of the SCP.

CPN Number Management

A call to a subscriber will typically result in the SSP switch sending a query to the SCP. If the SCP authorizes the call to be delivered to the subscriber, the CPN is sent unchanged on the call to the subscriber. If the SCP instructs the SSP to divert the call to the RCS, and if the RCS determines the call is a robocall, then RCS will store the announcement and may then inform the subscriber of that call. If so, the CPN from the call from the RCS may either reflect the number of the RCS or the number of the robocaller. Typically, if more than one robocalls (such as illegal robocalls) are periodically reported, the CPN will be that of the RCS. Thus, the subscriber will be able to readily identify the RCS call reporting a robocall or a plurality of robocalls. In one embodiment, illegal robocalls are not reported, but only legal ones are reported. If, however, the RCS prompts the caller in order to ascertain whether the caller is a live person, and the RCS determines the caller to be a live person, then the call will be transferred to the subscriber typically using the CPN of the caller, not that of the RCS.

Subscriber Communications with the RMS

The subscriber may perform some communication and management functions with the RMS by making a request after a call. For example, the subscriber may report a CPN that should be blacklisted or included on the whitelist by entering a DTMF code after the call. This is a limited from of communications. The request may be acted upon by the SSP switch or the RCS and they can update the SCP appropriately.

In another embodiment, the RMS may offer a web-based interface to the subscriber. The subscriber could use a conventional browser to interact with the RMS. This could be used to perform various functions such as review, edit, create, or delete numbers in a particular list. Review and edit certain parameters, such as how the RMS should treat numbers that are neither on the whitelist or blacklist. The subscriber could edit how many days the robocall announcement are kept. Any of the configurable subscriber parameters could be edited using the web-site access.

The subscriber could edit, for example, the number of seconds for which an answered call lasted in order for that number to be included on the whitelist. It was mentioned that 10 seconds was the limit, but a subscriber may want to change that to 25 seconds or some other value. The subscriber could also edit how they will be notified of calls, what type of calls, and when. The RCS retains information for calls it determines are not from live persons. This may include legal and illegal robocalls. The subscriber may indicate that legal robocalls are to result in a text message sent to a mobile phone, with a link to the referenced recording. Or, that an email comprising a transcription and a link be provided to the subscriber. It is possible that a voice call could be placed to the subscriber where the RCS plays the recorded announcement. With respect to when such notifications are to occur, in one embodiment legal robocall notification is to occur within 20 minutes of the call, but the notification should only occur during a user defined time window. Any particular day, times, or other reporting period could be indicated.

On the other hand, the illegal robocall notifications should occur to some other schedule, such as once a week or some other time period, or on a batch basis including their times, CPN, and some other information about all the calls occurring since the last report. These notifications could include additional information, such as the first sentence or two of the announcement transcribed for the subscriber.

Application to Mobile Smart Phones

The concepts and technologies herein could be adapted for either wireline or wireless phones. The aforementioned messaging diagrams illustrated a wireline phone interfacing to the SSP switch, but the SSP switch could just as equally interfaced to a mobile phone. In the case of wireless smart phones, the smart phone interface could further be used to facilitate subscriber management of the information described above.

In addition, the use of a smart phone allows the RMS system to provide additional information to the subscriber when offering the call. In one embodiment, calls are always offered to the wireless subscriber, but the SSP switch could be provide information (a "label") with a call indicating the status of the CPN, i.e., whether the CPN was on a whitelist or was not determined to be on the whitelist. The serving SSP switch could cause the smart phone to display whether the call was verified as a live person, if the caller interacted with the RCS. The serving SSP switch could also cause the smart phone to display with a call that the call was determined to be a legal robocall. In one embodiment, the RMS would not deliver known illegal robocalls to the wireless subscriber, but would divert them to the RCS for processing according to the means disclosed above.

Exemplary Computer Processing Device

Figure 7:
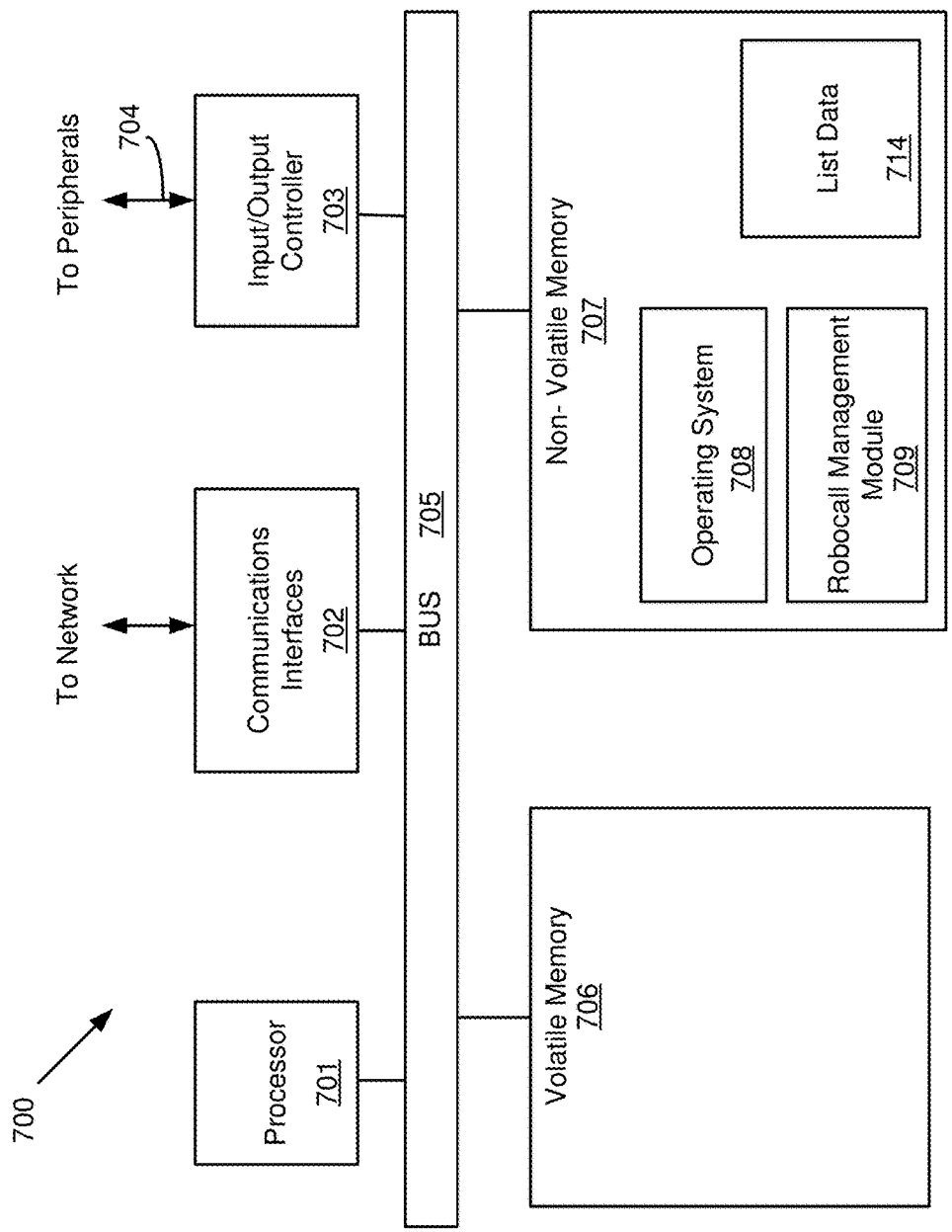
FIG. 7 illustrates one embodiment of a processing component that may be used in conjunction with the concepts and technologies presented herein.

FIG. 7 is an exemplary schematic diagram of a computer processing system that may be used in embodiments of various architectures, such as components shown in the architecture of FIG. 1 to practice the technologies disclosed herein, including the SSP switch, the SCP, and the RCS. In general, the term "computer processing system" may be exemplified by, for example, but without limitation by a specially configured or programmed: personal computer, server, desktop computer, tablet, smart phone, notebook, laptop, distributed processing system, server, blade, and the like, as well as any combination of devices or entities specially adapted to perform the functions described herein, such that the resulting system is a specialized processing system configured to perform the functions and capabilities disclosed herein, and is no longer a generic computer system. The computer processing system may also be a specially configured system, designed to optimize the operation of the component in the contact center based in part on the specialized software configured to perform the functions disclosed herein. For example, the SSP switch, SCP, or RCS could be a computer processing system that is specially configured to perform the functions disclosed herein. A SSP switch, SCP, or RCS as used herein would be interpreted by one skilled in the art as a special purpose processing system, performing functions that are not typical of a generic computer. This also may be the case for the other components disclosed herein.

As shown in FIG. 7, the processing system 700 may include one or more computing processors 701 that may communicate with other elements within the processing system 700 via a bus 705. The computing processor 701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like. In many cases, in order to perform the necessary analysis, such as determining frequencies, energy level, etc. of the audio signal, this will requires something more than a general purpose computer processor, such as a DSP processor.

In one embodiment, the processing system 700 may also include one or more communications interfaces 702 for communicating data via a network (such as a LAN or Internet) with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 703 may also communicate with one or more input devices or peripherals using an interface such as, but not limited to: a keyboard, a mouse, a touch screen/display input, microphone, pointing device, etc. The input/output controller 703 may also communicate with output devices or peripherals, such as displays, printers, speakers, headsets, banner displays, etc.

The computing processor 701 may be configured to execute instructions stored in volatile memory 706, non-volatile memory 707, or other forms of computer readable storage media accessible to the processor 701. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 707 may store program code and data, which also may be loaded into the volatile memory 706 at execution time. For example, the non-volatile memory 707 may store one or more modules 709 that may perform the above-mentioned process flows and/or operating system code 708 containing instructions for performing the process and/or functions associated with the technologies disclosed herein. The robocall management module(s) 709 may also access, generate, process, or store related data 722, including, for example, the data described above in conjunction with performing the various aspects of robocall management, including storage of the various forms of lists. This would include, but is not limited to: robocall processing operation, configuration values, timer values, counter values, account related data, call records, or any other data used to perform the disclosed functions and concepts. The volatile memory 706 and/or non-volatile memory 707 may be used to store other information including, but not limited to: records, applications, programs, scripts, source code, object code, byte code, compiled code, interpreted code, machine code, executable instructions, or the like. These may be executed or processed by, for example, the computing processor 701 and may form a part of, or may interact with, the module(s) 709. The module 709 is shown as being the robocall management module, but it could be any other module used to perform the concepts disclosed herein.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory or propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for processing a call comprising a voice call from a caller directed to a called party, comprising:
receiving the call at a service switching point ("SSP") switch configured to launch a query to a service control point ("SCP") in response to receiving the call;
launching the query from the SSP switch to the SCP, the query conveying a calling party number and a called party number derived from the call;
using the calling party number by the SCP to determine that the SSP switch should not offer the call to the called party;
responding to the query from the SSP switch by the SCP indicating the SSP switch should redirect the call to a robocall confirmation system ("RCS"), wherein the RCS is configured to ascertain if a live person is connected to the redirected call;

receiving at the RCS the redirected call;

answering by the RCS the redirected call;

providing by the RCS an audio prompt to the caller;

analyzing audio by the RCS provided by the caller after the audio prompt to determine whether the caller is a live person;

determining the caller is the live person; and transferring the redirected call by the RCS to the called party using the SSP.

2. The method of claim 1, wherein the transferred redirected call is offered to the called party indicating the calling party number of the call.

3. The method of claim 1, wherein the audio prompt requests a response from the caller.

4. The method of claim 3, wherein the response comprises speech from the caller.

5. The method of claim 1 wherein the redirected call from the SSP to the RCS uses the called party number of the call as the calling party number of the redirected call.

6. The method of claim 1 wherein the SCP determines the calling party number is not stored in a whitelist associated with the called party.

7. The method of claim 6, where the SCP further determines the calling party number is not on a blacklist associated with the called party.

8. A system for processing a call comprising a voice call from a caller directed to a called party, comprising:

a service switching point ("SSP") switch configured to receive the call and launch a query in response to receiving the call, wherein the query conveys a calling party number and a called party number derived from the call;

a service control point ("SCP") configured to receive the query from the SSP and determine whether the SSP switch should offer the call to the called party, and in response to determining the SSP switch should not offer the call to the called party, provide a response to the SSP indicating the SSP switch should redirect the call, thereby causing a redirected call; and a robocall confirmation system ("RCS") configured to:
receive the redirected call from the SSP switch,
provide an audio prompt to the caller,
analyze audio from the caller received after the audio prompt,
determine, based on the audio from the caller received after the audio prompt, the caller is a live person, and
upon determining the caller is a live person, transfer the redirected call to the called party via the SSP switch.

9. The system of claim 8, wherein the transferred redirected call is offered to the called party indicating the calling party number of the call.

10. The system of claim 8, wherein the RCS is configured to provide the audio prompt requesting a response from the caller.

11. The system of claim 10, wherein the RCS is configured to analyze audio from the caller received after the audio prompt comprising a dual tone multiple frequency ("DTMF") response.

12. The system of claim 8, wherein the SSP switch is configured to use the called party number of the call as the calling party number of the redirected call when redirecting the call to the RCS.

13. The system of claim 8, wherein the SCP is further configured to determine the calling party number is not stored in a whitelist associated with the called party.

14. The system of claim 8, where the SCP is further configured to determine the calling party number is not on a blacklist associated with the called party.

15. A method for processing a call directed to a called party, comprising:

receiving the call at a service switching point ("SSP") switch configured to launch a query to a service control point ("SCP") in response to receiving the call;

launching the query from the SSP switch to the SCP, the query conveying a calling party number and a called party number derived from the call;

using the calling party number by the SCP to determine that the SSP switch should not offer the call to the called party;

responding to the query from the SSP switch by the SCP by providing a response indicating the SSP switch should redirect the call to a robocall confirmation system ("RCS"), wherein the RCS is configured to ascertain if a live person is connected to the call;

receiving the redirected call at the RCS;

answering the redirected call by the RCS;

providing an audio prompt to the caller by the RCS;

analyzing audio by the RCS provided by the caller after the audio prompt to determine whether the caller is a live person;

determining the caller is not the live person;

in response to determining the caller is not the live person, recording the audio provided by the caller wherein the message is associated with the calling party number, and informing the SCP by the RCS that the caller is not the live person.

16. The method of claim 15, wherein the SCP in response to being informed by the RCS that the caller is not the live person includes the calling party number on a blacklist for the called party.

17. The method of claim 16, where the step of using the calling party number by the SCP to determine that the SSP switch should not offer the call to the called party comprises using the calling party number by the SCP to check whether the calling party number is indicated in a whitelist, and determining the calling party number is not indicated in the whitelist.

18. The method of claim 16, where the step of using the calling party number by the SCP to determine that the SSP switch should not offer the call to the called party comprises using the calling party number by the SCP to check whether the calling party number is indicated in a blacklist, and determining the calling party number is indicated in the blacklist.

19. The method of claim 15, where the response indicating the SSP switch should redirect the call to the RCS indicates a telephone number associated with the RCS where all calls received at the RCS using the telephone number are provided with the audio prompt.

20. The method of claim 16, wherein the blacklist is associated with the called party and other subscribers using the SSP switch.

* * * * *